United States Patent
Gervais et al.

(10) Patent No.: US 6,381,579 B1
(45) Date of Patent: Apr. 30, 2002

(54) SYSTEM AND METHOD TO PROVIDE SECURE NAVIGATION TO RESOURCES ON THE INTERNET

(75) Inventors: Paul M. Gervais, Endicott, NY (US); Alexander C. Barrentine, Royal Oak, MI (US); Martin S. Cox, Somerville, MA (US); R. Scott Coyle, Endicott, NY (US); Kenneth J. Hawley, Kalamazoo, MI (US); Gerald O. Neild, Jr., Friendsville, PA (US); Michael Leslie Richards, Beverly Hills, MI (US); Jay Joseph Thomas, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/336,365

(22) Filed: Jun. 17, 1999

Related U.S. Application Data

(60) Provisional application No. 60/113,817, filed on Dec. 23, 1998.

(51) Int. Cl.[7] .............................................. G06F 17/60
(52) U.S. Cl. ............................... 705/8; 707/9; 709/203
(58) Field of Search ........................ 705/8; 707/9, 10, 707/100; 709/201, 202, 203, 228; 345/335

(56) References Cited

U.S. PATENT DOCUMENTS

| | | | | |
|---|---|---|---|---|
| 5,483,652 A | * | 1/1996 | Sudama et al. | 707/10 |
| 5,692,129 A | * | 11/1997 | Sonderegger et al. | 707/103 |
| 5,740,362 A | * | 4/1998 | Buickel et al. | 709/201 |
| 5,761,499 A | * | 6/1998 | Sonderegger | 707/10 |
| 5,778,222 A | * | 7/1998 | Herrick et al. | 707/9 |
| 5,826,239 A | * | 10/1998 | Du et al. | 705/8 |
| 5,859,978 A | * | 1/1999 | Sonderegger et al. | 709/226 |
| 5,893,118 A | * | 4/1999 | Sonderegger | 707/203 |
| 5,911,143 A | * | 6/1999 | Deinhart et al. | 707/103 |
| 6,061,684 A | * | 5/2000 | Glasser et al. | 707/9 |
| 6,115,690 A | * | 9/2000 | Wong | 705/7 |
| 6,151,582 A | * | 11/2000 | Huang et al. | 705/8 |
| 6,157,915 A | * | 12/2000 | Bhaskaran et al. | 705/7 |
| 6,202,066 B1 | * | 3/2001 | Barkley et al. | 707/9 |

FOREIGN PATENT DOCUMENTS

| | | | | |
|---|---|---|---|---|
| EP | | 686915 A2 | * 12/1995 | G06F/9/46 |

OTHER PUBLICATIONS

Kerstetter. IBM expands supply chain (Enterprise Xspan virtual Internet supply chain). PC Week, v14, n44, p41 (1), 35723.*

Pompili. From NOS to net (directory services reviewed). PC Magazine, v16, n2, pNE1(7).*

Kapadia et al. On the Design of a Demand–based Network Computing System: The Purdue University Network Computing Hub. IEEE International Symposium on High Performance Distributed Computing, 1998, pp. 71–80.*

Shimizu et al. Hierarchical object groups in distributed operating systems. 8th International Conference on Distributed Computing Systems, 1988, pp. 18–24.*

* cited by examiner

*Primary Examiner*—Kyle Choi
*Assistant Examiner*—D. Robertson
(74) *Attorney, Agent, or Firm*—Whitham, Curtis & Christofferson, P.C.; John R. Pivnichny

(57) ABSTRACT

Provide an electronic-business-to-electronic-business portal that organizes the access to extended business applications. A method allows end users to access a server using standard Web browsers, and then view their own customized menu of applications. Enhanced security and administrative tools allow this portal to be shared throughout enterprises and across supply chains, providing secure access to collaborative applications by business partners and suppliers. Access to specific applications is granted to authorized users and teams, within and outside of a company. Real-time, on-line registration of users allows for rapid changes in teams and projects. Users can be added, deleted, or have access levels altered to reflect changes in the makeup of teams. Provide a common infrastructure for application administration, security management, and directory use, which can help reduce information technology (IT) costs and speed solution deployment.

20 Claims, 24 Drawing Sheets

☐ EnterpriseXspan Resource Class Definition

Key ⊕ *-field is required
click for help

▶ GENERAL INFORMATION ~301

| | | | |
|---|---|---|---|
| RESOURCE CLASS NAME* | NEWS ⊕ 301a | | |
| BASE CLASS:* 301c | ○ CONTAINER | ○ HTML CONNECTOR | |
| | ⊙ NOTES TEMPLATE | ○ SIMPLE URL LINK | |
| DESCRIPTION: ⊕ 301e | | | |
| VIEW ORDERING: ⊕ 301g | | | |

Users of this Class* $ResourceManager, $ResourceUser ⊕ 301b

Managers of this Class* ⊕
301d

▶ NOTES TEMPLATE INFORMATION ~302

SERVER NAME:* XspanDev/XspanEndicott ⊕ 302a
TEMPLATE FILENAME:* xspan/dbnews.ntf ⊕ 302c
DEFAULT DIRECTORY where New DBs are Created* xspan/news ⊕ 302e Default.Icon* i_c_news ⊕ 301f User Path:* /vfNWTData?OpenView ⊕ 302b
Manage Path: /VerifyProfiles?OpenAgent ⊕ 302d
On Creation Go To: Manage Path: ⊙ YES ○ NO 302f
Default User ACL Level: Author ⊕ 302g
Default Manager ACL Level: Editor ⊕ 302h

FIG.3

☐ Xspan Resource Class - by Resource Class Name - Lotus Notes

File  Edit  View  Create  Actions  Window  Help

Resource Class Definition

▼ GENERAL INFORMATION —161

RESOURCE CLASS  Red Cabinet
NAME
BASE CLASS: ●CONTAINER  ○HTML CONNECTOR
162      ○NOTES TEMPLATE  ○SIMPLE URL LINK DESCRIPTION: Red Cabinet for folders and Red cabinets
VIEW ORDERING:                           164

Users of this  $ResourceManager,$ResourceUser
Class:
Managers of this
Class:
                                    163    i_b_red_Cabinet
Default.Icon

▼ CONTAINER INFORMATION

Containers of this
Class may contain
other Containers
of only the
following.
Classes Containers of this
Class may contain
non-containers of
only following
Classes Office

SYSTEM AND METHOD TO PROVIDE SECURE NAVIGATION TO RESOURCES ON THE INTERNET

CROSS-REFERENCE TO RELATED APPLICATIONS

This application is a continuation-in-part of provisional patent application Ser. No. 60/113,817 filed Dec. 23, 1998, the subject matter of which is incorporated herein by reference.

BACKGROUND OF THE INVENTION

1. Field of the Invention

The present invention generally relates to using the Internet to provide businesses with communication paths with their suppliers.

2. Background Description

One of the biggest challenges in business today is how to connect people in one organization to applications in another organization, or company, in a secure fashion.

The IBM EnterpriseXspan Environment Server is a software solution that provides World Wide Web (hereafter, "Web") based application navigation and access control to businesses needing to connect with other businesses. The EnterpriseXspan Environment Server is a software application residing on a computer and plugs in to IBM's Lotus Domino application, also residing on the computer.

Lotus Domino is the Lotus product that delivers Internet functionality using Lotus Notes technology. Lotus Domino delivers the strength of the Lotus Notes database views, forms, and documents to browsers while respecting security. Lotus Domino also delivers Web HTML (HyperText Markup Language) pages and can run CGI (Common Gateway Interface) programs like any other Web server. Lotus Notes is a distributed client/server database application that enables groups of people to organize, track, access, and share information over a network.

The EnterpriseXspan Environment Server application enables companies to deliver secure, versatile and powerful software tools and services across the extended enterprise, such as a supply chain, in easy-to-use folders with distributed registration and administrative features. The application also supports Internet security standards, and it contains advanced features allowing links to existing applications. EnterpriseXspan is IBM product number 5799-A78 and a description of the product may be found in associated product literature. (EnterpriseXspan and EnterpriseXspan Environment Server are trademarks of IBM Corporation, and Lotus is a registered trademark of IBM Corporation)

SUMMARY OF THE INVENTION

It is therefore an object of the present invention to provide a way to set communication paths, or a business-to-business electronic portal, using a common server via the Internet so that manufacturers and suppliers or other business partners can create an extended enterprise. As a portal, the EnterpriseXspan product enhances the ability of a business enterprise to organize access and sharing of information and applications. Enhanced security and administrative tools allow this portal to be shared throughout an extended enterprise and across supply chains, providing secure access to collaborative, business or other types of applications by business partners and suppliers.

According to the invention, there is provided a method that allows resource users within an Enterprise to access a common server using standard Web browsers, so that the resource users view a menu which has been customized for them. A resource user's menu is comprised of a hierarchy of containers, applications and links. A resource integrator defines classes of resources that may be used to create this hierarchy.

Resource managers, having authority over the specific application link, grant accesses to the resource users and teams of resource users within and outside of a company so that they may easily view and utilize the necessary applications in an organized fashion. By granting these accesses, a desired hierarchy is then viewed in a menu. As a result, companies can form electronic-business-based teams, using the tools and environment within a common server.

The invention allows for rapid changes in teams and projects, through the real-time, on-line registration of resource users. Resource users can be added, deleted, or have access levels altered to reflect changes in the makeup of teams. Companies can benefit from the ability to see "who" has access to "what" applications throughout the supply chain or the extended enterprise.

Because it can be deployed within a business, or as an extranet solution across many businesses, companies can extend and protect investments in existing applications and technology. Companies can also gain from a common infrastructure for application administration, security management, and directory use, which can help reduce information technology (IT) costs and speed solution deployment.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a screen print showing the Lotus Notes Client interface to Resources Class Definition page;

FIGS. 15 through 23 are screen prints illustrating the steps taken by the Resource Manager to implement to method shown in FIG. 14.

DETAILED DESCRIPTION OF A PREFERRED EMBODIMENT OF THE INVENTION

Definitions

Figure 1:
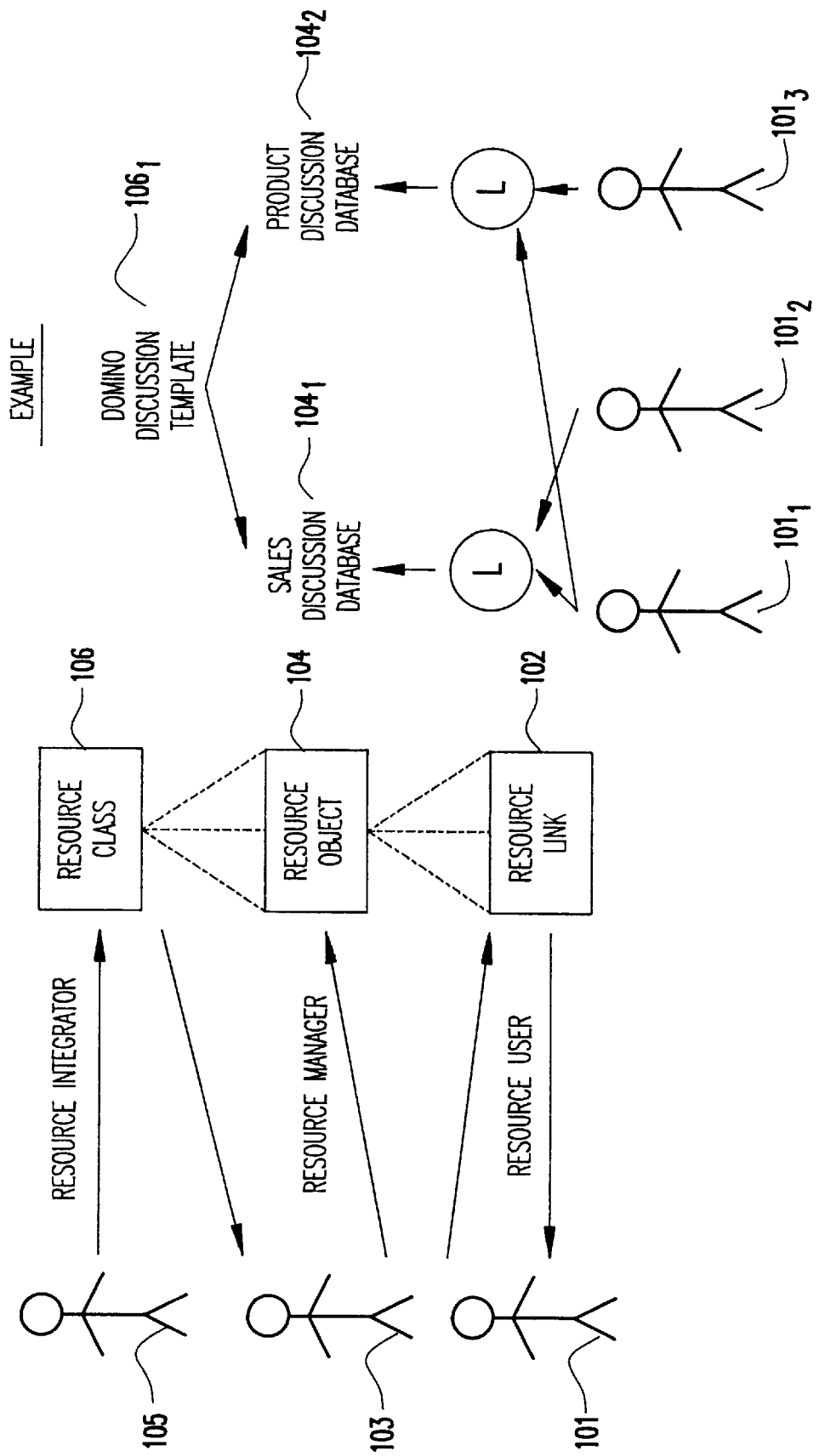
FIG. 1 is a diagram illustrating how users with various levels of authority can interact with the system according to the invention.

The present invention will be better understood by reference to the following definitions:

1. Nested Containers: Resources within the EnterpriseXspan Environment Server are presented to the user as part of a container hierarchy. Access to each of the containers can be controlled dynamically through a Web interface. Controlling access to each container and its contents is accomplished through user groups in the directory, currently the Lotus Domino application Name and Address Book (NAB). These groups are changed dynamically through a Web interface by Web users that are defined as resource managers of the container. The EnterpriseXspan Environment Server allows for a container's access to be controlled explicitly by selecting individual users of the container or by inheritance where a container's access would match access to the parent container.

2. Dynamic Containers: The containers that hold resource links are entirely tailorable by the resource integrators. Resource integrators in an EnterpriseXspan system can define any container hierarchy that they wish. Resource integrators can also dynamically define the rules for what containers can contain other containers. The default set of containers that is shipped with the product has two defined container types: cabinets and folders.

3. Dynamic Resource Plug-in Interface: Allows adding of new applications to the list of available resources in a hierarchy accessible to a user. Allows a system administrator, or resource integrator, to add a document to a Lotus Notes database within the EnterpriseXspan Environment Server, defining a class or template that provides the information necessary for resource managers to create the resource objects (sometimes a new database), through a Web interface.

4. Link-Object-Class Model of Management: A three-tiered model for defining Web resource links which enables a plug-in interface for applications, simplifies management of user access, allows flexible relationships between resource classes, resource objects and resource links. Allows system managers, or resource managers, to provide the same resource in multiple containers by managing a "many to one" relationship between resource links and objects.

5. Bull's Eye: A method for managing the sets of users and managers in a nested container hierarchy where managers can see all the contents of each container managed by them, and users see the entire hierarchy for only their chosen and authorized resources.

6. Dynamic User Interface Through Use of Profile Documents: Allows resource managers to dynamically alter several aspects of the user interface from a Web user interface. Changes are distributed to each of the databases by rewriting a profile document for that database. The Web page is presented to an end user with user interface parameters such as background color and message content which is looked up in the profile document, reflecting current values.

Description of the Problem

One of the biggest challenges in business today is how to connect people in one organization to applications in another organization, or company, in a secure fashion. Globalization, deregulation and demand for shorter product cycles are forcing organizations to change the way they work—to reduce cycle time, to increase responsiveness, to lower costs. Succeeding in today's competitive environment requires new levels of communication and collaboration among businesses and their customers, suppliers and distribution networks.

Traditional enterprises are costly, inefficient and hard to maintain or modify. The infrastructure of a traditional enterprise is a dedicated or private network. Information sharing outside a company or intranet is only achieved with great cost and complexity. Additional members are added to intra-company teams with difficulty, requiring customized administration methods. Access to shared information is physically controlled by connection to an internal corporate network and/or simple userid and password access.

Navigation of the enterprise information is equally difficult in a traditional enterprise. Navigation objectives are application specific with no bundling of disparate applications. A user must learn his or her own way through a maze of information. The information system is administered by an information technology (IT) organization within the enterprise, providing high assurance, but reduced flexibility and speed. Moreover, application technology favoritism is based on intra-enterprise standards and goals.

Extended Enterprise Solution

In contrast to traditional enterprises, the present invention utilizes a new approach to sharing information and access to systems. The present invention is implemented on IBM's EnterpriseXspan Environment Server, in release 3.5. End users can access the EnterpriseXspan Environment Server using standard Web browsers, and then view their own customized menu of applications—an electronic-business-to-electronic-business portal that organizes the access to extended business applications in a shared, global network. Enhanced security and administrative tools allow this portal to be shared throughout enterprises and across supply chains, providing secure access to collaborative applications by business partners and suppliers.

The present invention enables companies to deliver secure, versatile and powerful software tools and services across the extended enterprise, such as a supply chain, in easy-to-use folders with distributed registration and administrative features. The server also supports Internet security standards, and it contains advanced features to let existing applications be "plugged in."

Access to specific applications is granted to authorized users and teams, within and outside of a company. As a result, companies can form electronic-business-based teams, using the tools and environment within the IBM EnterpriseXspan Environment Server.

Rapid changes in teams and projects is accomplished through dynamic Web management of user access to applications and through a user registration process. Users are added, deleted, or have access levels altered by resource managers to reflect changes in the makeup of teams. User access is controlled by group documents in Lotus Notes NAB. The present invention ensures that groups relate to each other correctly through the Bull's eye model, to be discussed later. Companies benefit from the ability to see "who" has access to "what" applications throughout the supply chain or the extended enterprise.

Distributed administration supporting a variety of application ownership allows any mix of centralized control or user based administration. The distributed registration process allows a system administrator to give a desired number of user slots to a supplier and gives the supplier access to manage these tokens. The supplier can then assign tokens to resource users by creating new usernames and passwords in the system. Thus, the system administrator only needs to interact with a subset of all of the users in the extended enterprise. There is no need for a centralized management of accounts.

Because it can be deployed within a business, or as an extranet solution across many businesses, companies can extend and protect investments in existing applications and technology. Companies can also gain from a common infrastructure for application administration, for security management and directory use, which can help reduce IT costs and speed solution deployment. Application technology independence supports any variety of applications served from across the extended enterprise.

The present invention includes innovations to the EnterpriseXspan Environment Server product that were introduced with release 3.5. Prior implementations addressed the same business problem, but with a much simpler approach to design. Some of the major differences between earlier releases and the present invention are:

Earlier releases had no concept of Resource Objects or Resource Classes. This means that:
  There was no plug-in class interface. If a new type of resource needed to be added to the product, a software development team would need to get involved to code the new tailored interface.
  Resources could not be shared between containers. If two cabinets needed links to the same application, two separate links would need to be defined and none of the link definitions would be shared.
There were no nested containers. Every link was included in a container and there was no hierarchy. Access to resources was managed in groups, but group names were not included within groups for inherited access.

While the present invention takes advantage of the capabilities of the Lotus Notes and Lotus Domino products, one skilled in the art could easily implement the aspects of this invention using any number of tools, now known or to be developed in the future. For instance, there are a variety of distributed client/server database applications that enable groups of people to organize, track, access, and share information over a network. In addition, many products exist that provide both intranet and Internet browsing functionalities.

Link-Object-Class Model of Web Resource Management

The first aspect of the invention is Link-Object-Class Model of Web Resource Management. A three-tiered structure for defining Web resource links is used.

At the top level are resource classes. A resource class is a template for creating new resources. Resource classes are based on predefined types of resources, as defined by a resource integrator and described below. Examples of resource classes are:

Application—a template for linking to Web URLs.
Discussion—a Lotus Domino application template for creating discussion applications.
News—a Lotus Domino application template for creating news applications.
At the intermediate level, each time a resource is defined, an instance of its class is generated along with a link to that instance. That instance is referred to as an "object". At the lowest level, are resource links. There is a one-to-many relationship between a resource class and the resource objects defined within that class. Likewise, there can be a one-to-many relationship between a resource object and the resource links that point to that object.

Referring now to FIG. 1, the Lotus Domino implementation of the Link-Object-Class model of Web resource management translates to using three separate Lotus Domino databases: one database containing resource link documents 102, one containing resource object documents 104, and one containing resource class documents 106, as described below. When a user defines a new resource, both an object for that resource and a link to the object are created in their respective databases. The link is defined to be a "child" of the container from which the definition was initiated.

FIG. 1 illustrates how users with various levels of authority can interact with the system. One should note that users are identified and authenticated via a standard userid and password protocol. Starting at the bottom left, a resource user 101 has a collection of resource links 102. The resource user 101 is simply allowed to link to resources to which he or she has been given access. In the example on the right, resource users $101_1$, $101_2$ and $101_3$ are accessing either a Sales Discussion database $104_1$, a Product Discussion database $104_2$, or both.

The resource manager 103 is the person who has created the resource objects 104. In the example illustrated, the resource objects are the discussion databases $104_1$, and $104_2$. The resource objects 104 are created based on a set of resource classes 106 that have been predefined by a Resource Integrator 105. In the example illustrated, the resource class is a Lotus Domino Discussion application template $106_1$.

The present invention is an improvement over the earlier releases of the EnterpriseXspan Environment Server for several reasons:
Earlier versions had a hard-coded static single level containment hierarchy.
Earlier versions did not allow the customer to tailor the looks and names of containers.
Earlier versions did not allow the user to dynamically add new Lotus Domino application templates without reprogramming the product.
Earlier versions did not allow multiple links to a single object.

One of the benefits to this design is that it allows a user who is allowed to create and manage resources to add a single resource to more than one container. The user can then give the link(s) a name(s) that makes sense within the context of the container to which they are added.

This design gives resource managers added flexibility when organizing a user's view of the system to which he or she has access. Resource managers are allowed to create links from one container to the other or save a set of objects which are no longer in use but may become useful again.

The goal of Link-Object-Class model of resource management is to provide secure navigation to business applications across the Internet. Each of the "Resources" described is actually an HTML (HyperText Markup Language) link to an application somewhere on the intranet of the hosting company or on the public Internet.

In some cases these links are simple Uniform Resource Locator (URL) pointers to the target Web site. In other cases, the link is a URL link to an integrated Lotus Notes application residing on the same server. In all cases, a set of parameters is used to decide how to construct the resource. The parameters needed for constructing an object and the links associated with it are defined in the class document. All class documents in the EnterpriseXspan Environment Server product reside in the class database. This is a Lotus Notes database with a file name of abrsclss.nsf that is part of the EnterpriseXspan Environment Server product.

Figure 2:
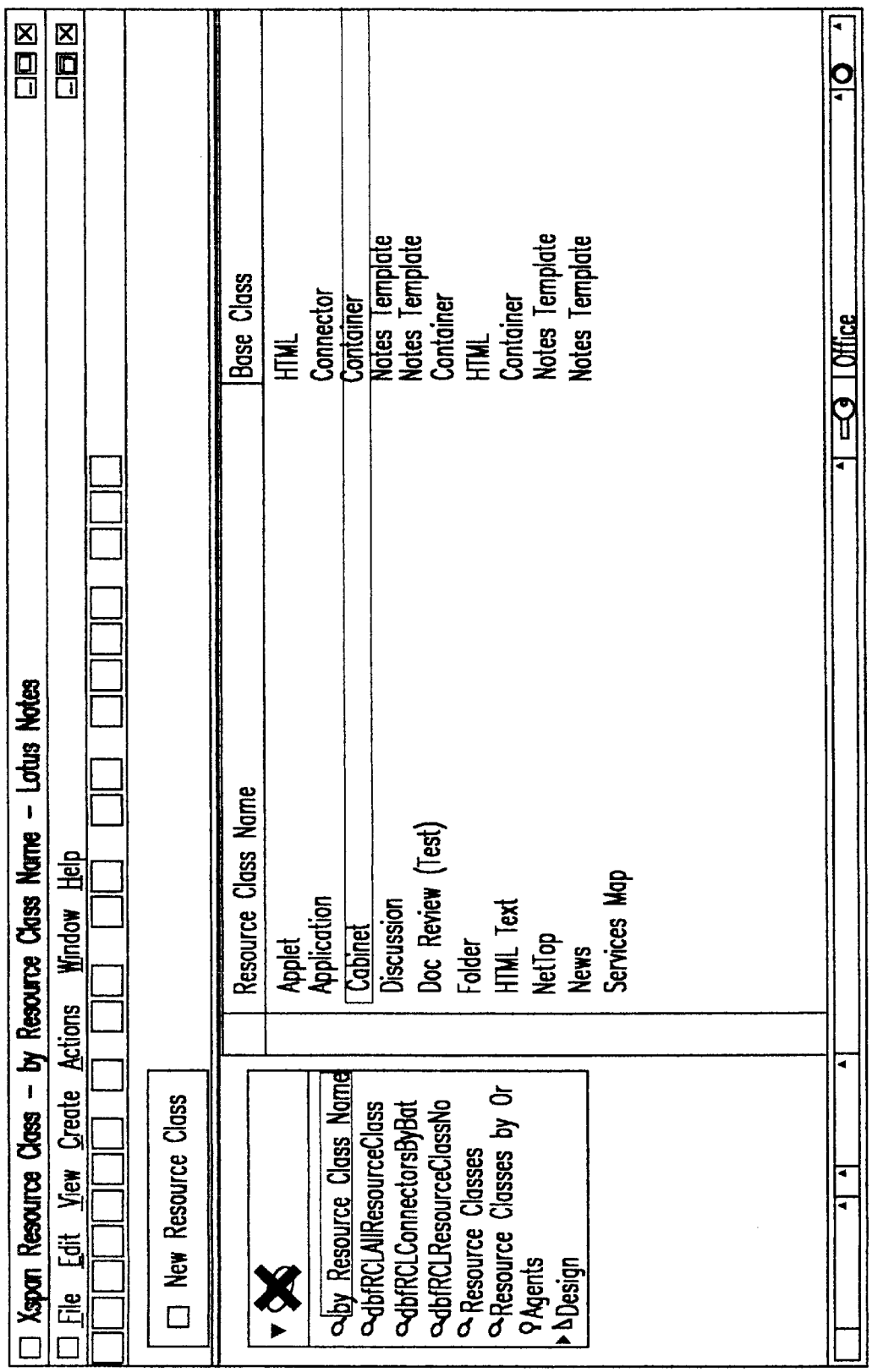
FIG. 2 is a screen print showing the Lotus Notes client (administrative) interface to the Resource Class database as used in a preferred embodiment of the invention.

FIG. 2 is a screen capture of a view of a class database with several class documents described. This is the Lotus Notes application view of the resource class database that a system administrator, or resource integrator, might use to alter the classes defined. This shows a list of the currently defined classes in the system. From this screen, a resource integrator can add new classes to this database or click on one of the current classes to alter its definition.

The creation of a class document allows a system resource manager to define new resource objects in the system. Each resource object contains the information necessary to generate a link to a target application. This information in the resource object document is inherited from the resource class document in the resource class database. The class documents dictate the necessary parameters and the behavior of each of their child objects. Adding a resource class document allows resource manager to define new resource objects with different behaviors than those of the existing objects in the system.

FIG. 3 shows a screen capture of the Resource Class Definition page. In this example, FIG. 3 illustrates a class document and the information needed for that class. For instance, General Information 301 for the class consists of: Resource Class Name 301a; Users of this Class 301b; Base Class 301c; Managers of this Class 301d; Description 301e; Default Icon 301f; and View Ordering 301g. Notes Template Information 302 consists of: Server Name 302a; User Path 302b; Template Filename 302c; Manage Path 302d; Default Directory where new Databases are Created 302e; On Creation Go To Manage Path toggle 302f; Default User Access Control List (ACL) Level 302g; and Default Manager ACL 302h. The process used by a resource integrator to cerate new classes will be discussed later.

Figure 4:
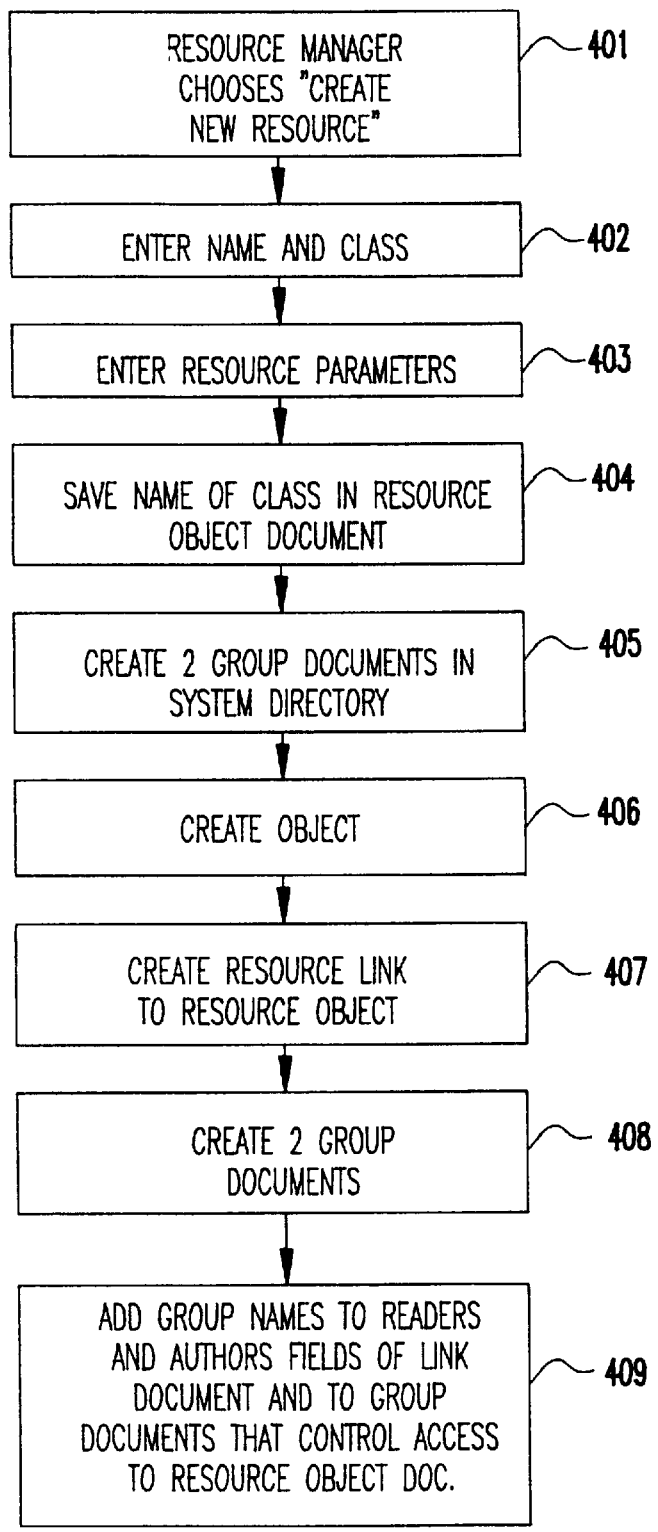
FIG. 4 is a flow diagram showing the method of creating a resource object document and the associated resource link document, according to the present invention.
Figure 20:
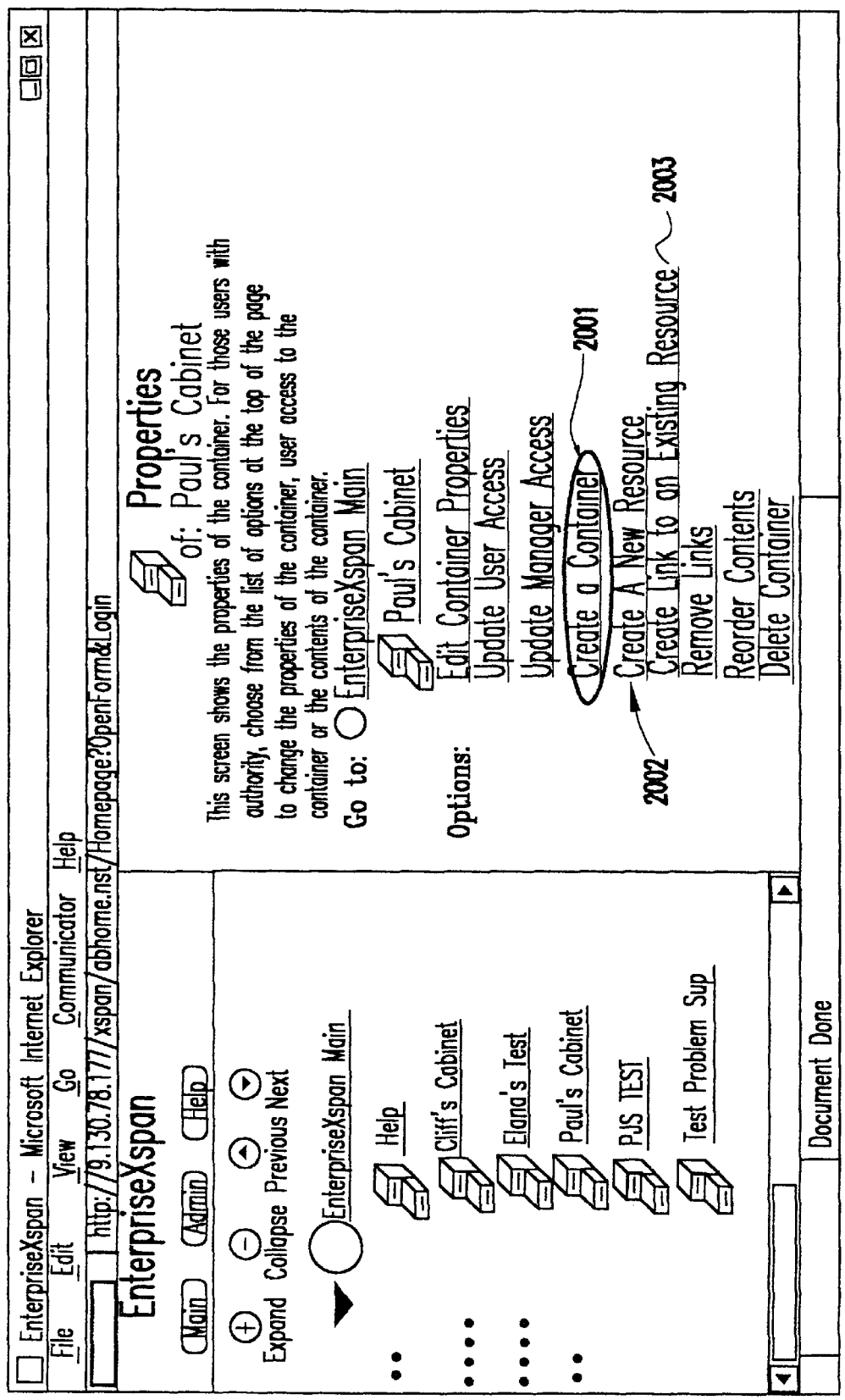

FIG. 4 shows the logic flow for creating resource links and resource objects from a set of defined resource classes in the present invention. In order to create a new resource, the resource manager chooses "Create New Resource" from the properties of the container in function block 401 as shown in FIG. 20 at 2002. The system prompts the resource manager for a resource name and class which is entered by the resource manager in function block 402. Based on the class supplied, the system prompts for additional parameters in function block 403 which are then entered by the resource manager. These parameters are needed to create a resource object document in function block 404 in the resource object database to represent the new object. Attributes are copied from the class document. The prompted parameters and parameter defaults are defined in the resource class document in the resource class database. Entered parameters may include a URL or a piece of HyperText Mark-up Language (HTML) text or categories in a Lotus Domino Discussion Database. The name of the class is saved in the resource object document, providing a connection between the object and its parent class document.

In addition to creating the resource object document, the system creates two group documents in the system directory in function block 405. The groups control access to the resource object document and in some cases, the Lotus Domino application database created in association with the link. The group names are based on a system unique ID string that is obtained when the resource object is created. The system then creates the object in function block 406. This could be as simple as adding a URL to the object document or as complex as generating a new Lotus Domino application database based on a Lotus Domino Application template database and saving the database in a specified subdirectory on the server.

After creating the resource object, the system creates a resource link to the resource object in function block 407. This document contains the URL necessary to "Launch" the resource. The resource link document resides in the resource link database. It is the link document that appears in the user interface. Each link document contains the system unique ID of the container document in which it was created. Views of the contents of a cabinet or container are actually views of link documents that contain the unique ID of that container as a parent ID. Each resource link document also contains the system unique ID of the resource object with which it is associated. This field acts as the link between the resource link and the resource object.

Once the resource link document has been created, the system again creates two group documents in the system directory to control access to the link: one for read access and one for read/write access to the document in function block 408. These group names are added to the readers and authors fields of the resource link document in function block 409. These group names are also added to the group documents that control access to the resource object document. This allows dynamic addition and deletion of new links. The group names are based on a combination of the system unique ID of the parent container document and the system unique ID associated with the link.

Nested Containment Model for Secure Resource Navigation

A second aspect of the invention is the Nested Containment Model for Secure Resource Navigation. Resources are presented to the user as part of a container hierarchy. The Web user interface for this is shown in screen capture of FIG. 5. The figure shows the browser window view of the EnterpriseXspan Environment Server interface. The window is divided into three frames. The top left frame is referred to as Frame A. The lower left frame is referred to as Frame B or the Navigation Frame, and the right hand frame is referred to as Frame C.

Referring again to FIG. 5, Frame A 501 contains the system identifier and three navigation buttons: Main 501a, Admin 501b and Help 501c. These three buttons are visible from anywhere within the EnterpriseXspan Environment Server and are provided for quick navigation to different areas of the system. The Main button 501a causes the main system container or NetTop to display in Frame C 503. This is useful if the user has navigated deep into another area of the system and would like to return to the top of the hierarchy of containers (described below). In this example, NetTop is Xspan Briefing Center 502b. The Admin button 501b brings the user to the opening panel of system administrator functions. These panels allow non-privileged users to perform functions such as changing their password. Privileged users such as System Administrators can create new userids, manage person groups, alter system settings such as fonts, background colors or graphics or examine reports on system activity. The Help button 501c opens a database of system help documents in a separate browser window.

Frame B 502 is also referred to as the Navigation Frame. This frame contains a view of all of the containers and resource links within the system hierarchy to which the user has access. This list of resources is user dependent. Users with access to different sets of resources will see different contents in Frame B 502. The top set of buttons 502a allow the user to control the appearance of the view. The first set of buttons ("+" and "−") allow the user to expand and collapse the view, respectively. The second set of buttons ("^" and "v") allow the user to navigate forward and backward in the view, respectively. Clicking any of the lines in the view, starting with the one labeled "Xspan Briefing Center" 502b will cause the contents of that container with that name to be displayed in Frame C 503. The Containers in Frame B 502 "contain" combinations of other containers or resources. Resources are URL links to other applications or other Web sites. In Lotus Notes terminology, the hierarchical view displayed in Frame B 502 is created using a response hierarchy of documents. There is only one "document" in the database: the NetTop. In this case the NetTop is labeled "Xspan Briefing Center" 502b. All other containers and resource links in the system are response to response documents. In this case, the cabinet labeled "AAA Supplier Network" 502c is a response to the NetTop 502b and the containers labeled "Project Alpha" and "Project Omega" 502d are responses to "AAA Supplier Network". "Global Industry Solutions" 502e and "ABB" 502f are also responses to the NetTop 502b. Each of the lines displayed in Frame B 502 are URL links that open the document in Frame C 503.

Frame C 503 is used to display content. This varies depending on user activity. If a user clicks on a container labeled "AAA Supplier Network" 502c displayed in Frame B 502, Frame C 503 will display the contents of that container. If the user clicks on one of the items that is displayed within that container, for instance, "AAA Supplier Discussion" 503d, Frame C will contain the Web user interface of the application to which that item is linked. If the user clicks the Admin button 501b then Frame B 502 will display the menu of options in the administration panel.

Figure 5:
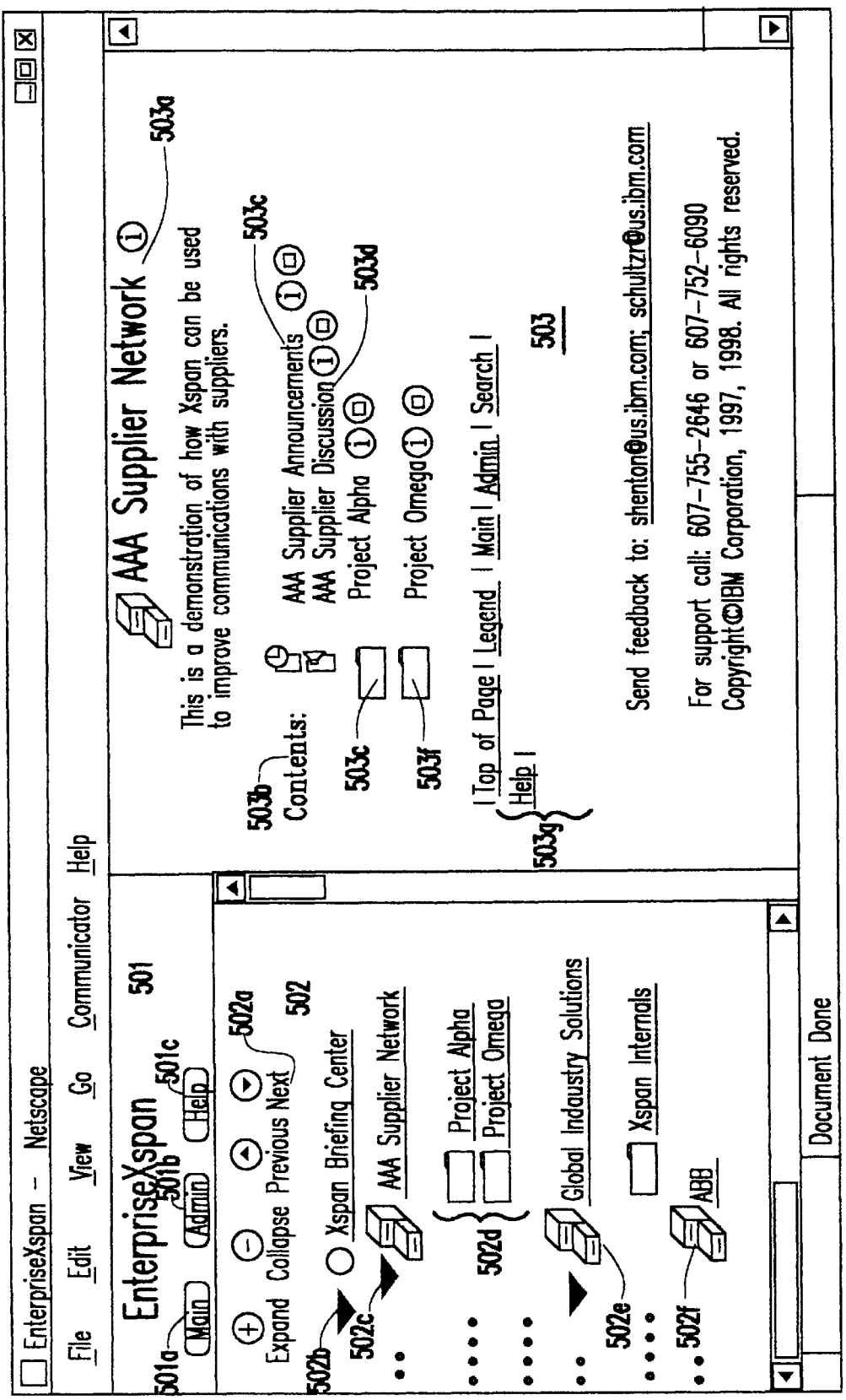
FIG. 5 is a screen print showing a sample resource and container hierarchy within IBM's EnterpriseXspan Environment Server.

In the view displayed in FIG. 5, Frame C displays the contents of the Container labeled "AAA Supplier Network". The top line in the Frame 503a displays the title of the container. A description of the use of the container as it was described when the container was created is displayed below the title 503a. The "Contents" section 503b displays all of the contents of the container. In this case, the "AAA Supplier Network" cabinet contains two links 503c and 503d, and two other containers 503e and 503f. The two links "AAA Supplier Announcements" 503c and "AAA Supplier Discussion" 503d display links to other Lotus Domino databases that are managed by the EnterpriseXspan Environment Server. Clicking on these links would display the default Lotus Domino view in each of those databases or applications. The two folders, "Project Alpha" 503e and "Project Omega" 503f display links to other containers, in these cases, folders, which would display forms similar to the one shown in Frame C 503, if selected by clicking on their links. The items displayed as contents of a container are really a list of Lotus Notes documents that are responses to the container being displayed. Everything below the content list is referred to as the footer 503g. The footer contains a series of navigation links with an option to send feedback to a system administrator.

Figure 6A:
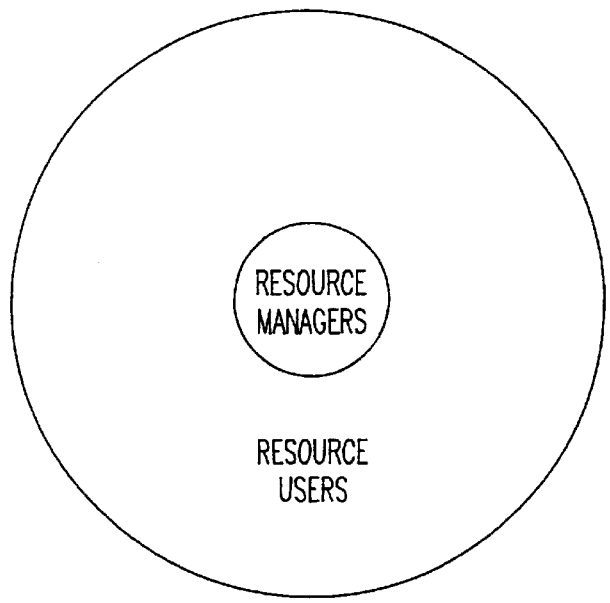
FIG. 6A is a Venn Diagram showing the manager group as a subset of the user group.

The present invention implements a security access model for its hierarchical container sets. Each entity in the system hierarchy of containers and resources has both a group of users and a group of managers. The user group has read access to the entity and the management group has read/write authority to the entity. The manager group is a subset of the user group as shown in FIG. 6A.

Each user in a Lotus Domino system has, associated with them, a document in a Lotus Domino database called the Name and Address Book (NAB) or user directory. This document is used by the Lotus Domino application to check user identity and authenticate the user.

Each document in Lotus Notes is allowed to have Reader and Author name fields. These fields determine who can read and edit the document, respectively. The fields can contain either individual user names or collections of users which are stored in group documents in the NAB. If a user's name does not appear in the Reader Names field, then that document will not appear to the user through a Lotus Domino Web interface.

As container and resource documents are created in the EnterpriseXspan system, a system unique identifier is generated and associated with the document. These identifiers are used to create a naming structure for groups in the NAB that associates the groups with a resource link, resource object or container in the system.

This method of managing access to resources in the EnterpriseXspan Environment Server through use of groups in the NAB was implemented prior to release 3.5. However, the present invention is an improvement now that it has the ability to nest containers, making the management of resources accesses much more complex. In previous releases, there was no need to nest the groups that control resource link and container access. There was no response hierarchy in the container documents and there was no concept of a NetTop. Each container had a group that controlled access to it and each resource also had a group that controlled access to it. The access was managed individually through a Web interface.

In contrast, in the present invention, the EnterpriseXspan system allows nested containers. To implement controlled access to the hierarchy of containers, the EnterpriseXspan system makes extensive use of nested groups in Lotus Notes. Use of nested groups involves adding the name of one group as a member of another group. If the name of "group A" is listed among the members of "group B", then the members of "group A" will have access to all documents that list "group B" in their Reader or Author names fields. This concept is used extensively by the EnterpriseXspan Environment Server to implement its Container Hierarchy Access Model.

The groups used to control reader and editor access to the container documents can be changed dynamically through a Web interface by Web users that are defined as managers of the container. The EnterpriseXspan system allows for a container's access to be controlled explicitly by selecting individual users of the container or by inheritance where a container's access would match to the parent container.

For each individual resource link or container, user and manager access can take one of two forms:

1. Inherited or implicit access means that the group of users or managers for this entity is the same as the corresponding group for the container that holds the entity. This can be thought of simply as "use the same managers as my parent".
2. Explicit access means that a manager of the entity has specifically chosen users or managers for that entity.

The model of access management applies two rules for managing access to containers and resources:

1. A manager of a container or resource can never have that management authority removed as long as that manager manages the parent container. This implies that the list of managers for containers as one gets "deeper" in the hierarchy of containers can only grow; it can never shrink.

2. A user can never be given access to a container if that user did not have access to the parent container. This implies that the list of users as one gets "deeper" in the hierarchy of containers will only shrink; it will never grow.

Figure 6B:
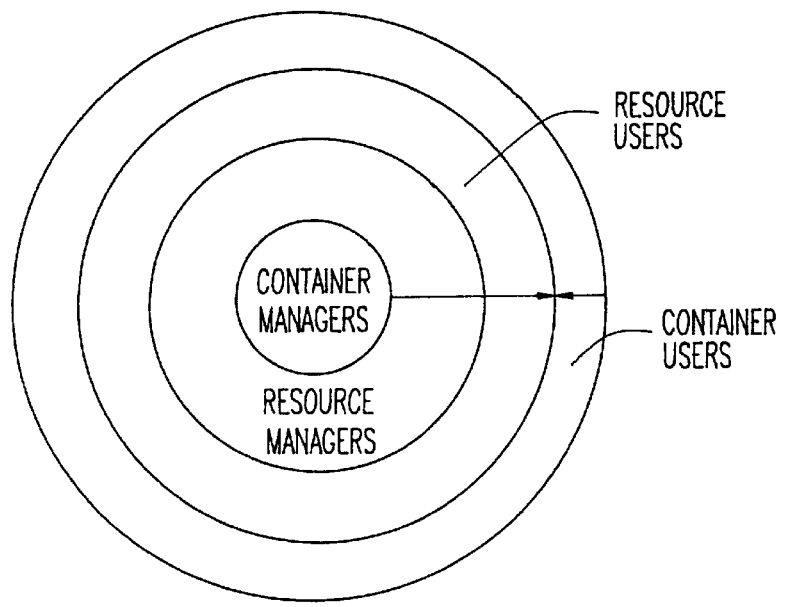
FIG. 6B is a Venn Diagram showing the relationships of the several groups of users of the system.

The name "Bull's eye" comes from the Venn Diagram consisting of concentric circles showing how these groups relate to one another, as shown in FIG. 6B. This model of access management specifies that, when a user creates a new container or a new resource link, the default set of managers of the entity should be the managers of its parent container. The managers in this default set of managers can never be removed from the set of managers until their management authority for the parent container is removed.

The list of managers for a resource or container can only be altered by a user that is already in the management list. The user side of the Bull's eye management model specifies that users of a given container or resource link must also be users of the parent container. Therefore, the only potential additional managers of the resource link or container are those users of the parent container that are capable of having manager authority and are not already in the management list.

The following discussion provides examples of containers and resource documents being created according to the invention, and illustrates the groups of users and managers that are created with them. For example, in the description of FIGS. 7 through 12, the string "$Managers" is used to represent the group of all system managers in the NetTop Hierarchy and the string "$Users" is used to represent the group of all users in the Hierarchy. Strings such as "M1", "M2" and "M3" are used to represent individual users with resource manager privileges, or in other words, they are allowed to create and manage resources. Strings such as "U1", "U2" and "U3" are used to represent users with only resource user privileges, or rather, they are not allowed to manage or create resources, but only view them.

Figure 7:
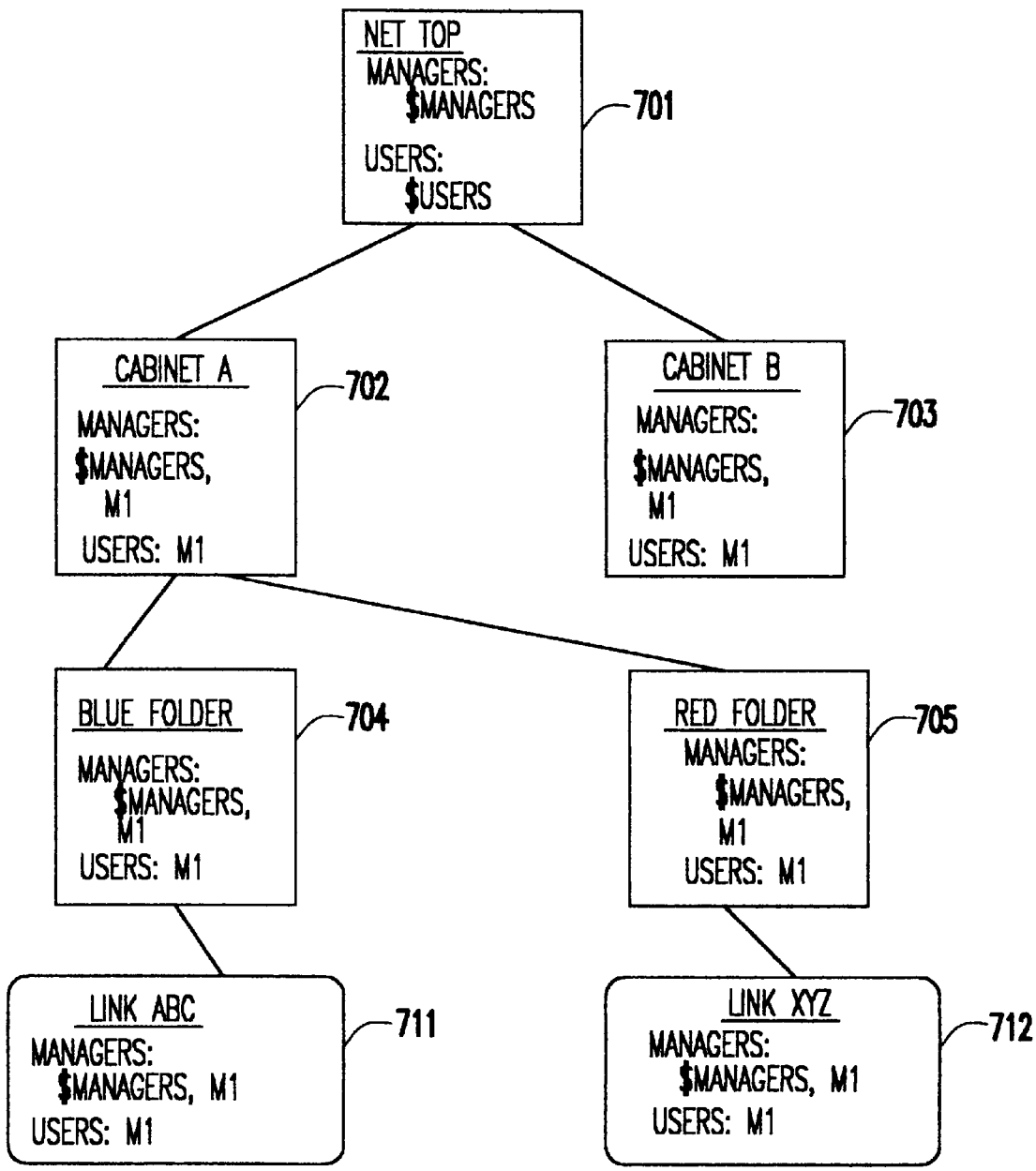
FIGS. 7 through 12 are hierarchical diagrams that illustrate how groups of users and managers are created with container and resource documents.

Blocks in FIGS. 7 through 12 represent containers and ovals represent resource links. Referring first to FIG. 7, an initial configuration of resource links and containers is shown. For instance, all of the containers 702, 703, 704, and 705 and resources 711 and 712 were created by Resource Manager, M1. User M1 therefore becomes, by default, the only user of the resources and containers. Because of the Bull's Eye model described above, as illustrated in FIGS. 6A and 6B and as a result of managing the NetTop 701 base container, the group of managers, $Managers, also manage everything beneath NetTop 701.

Figure 8:
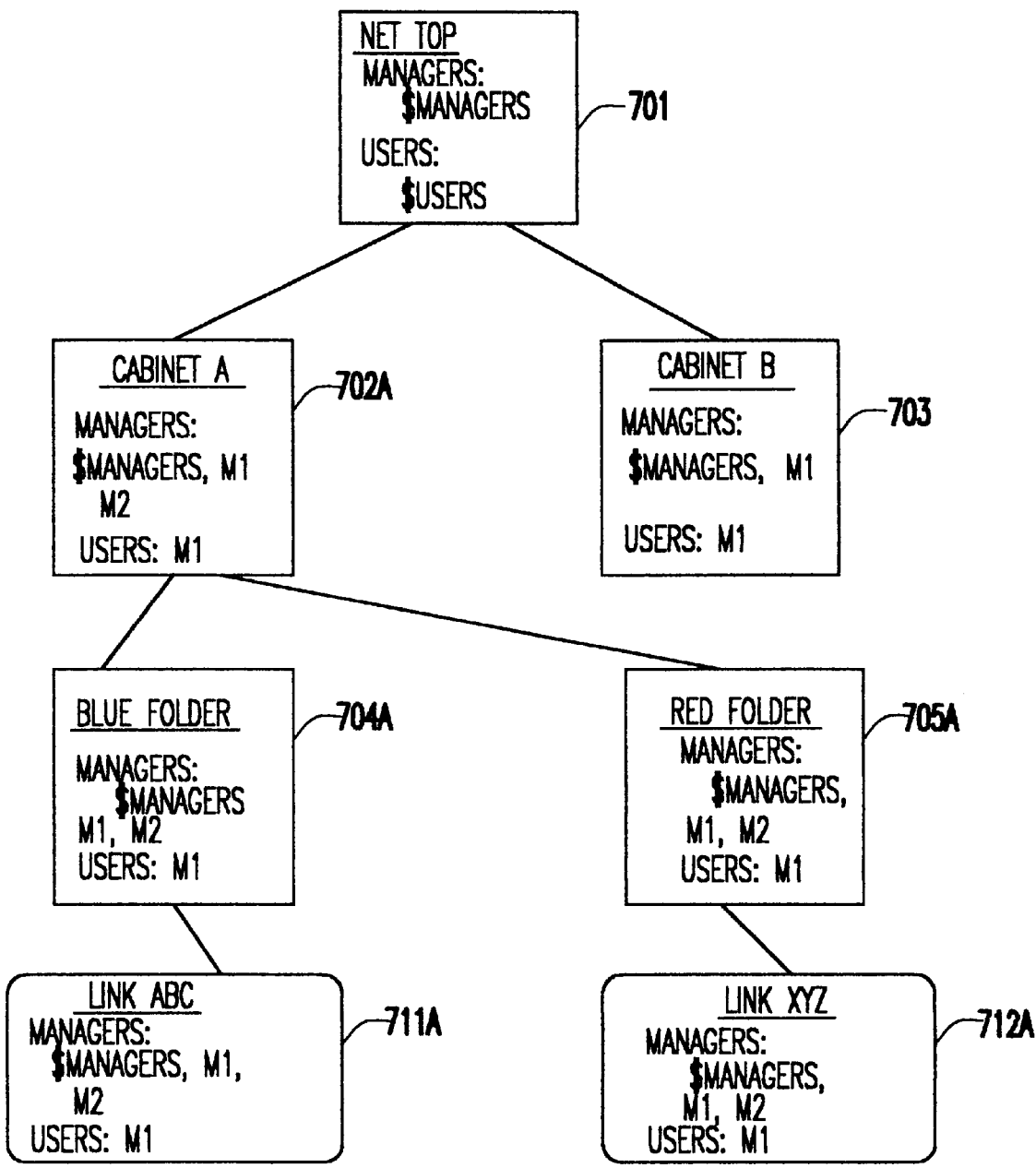

In FIG. 8, the Resource Manager M1 adds Resource Manager M2 as a manager of Cabinet A 702a As a result, M2 is recursively added as the manager of every other container 704a and 705a and resource link 711a that is included in Cabinet A 702a. This is done because the Bull's Eye model states that if a Resource Manager manages a container, it must manage every container within that container. Note that M2 is not added as manager of Cabinet B 703 because it is not contained in Cabinet A 702a.

Figure 9:
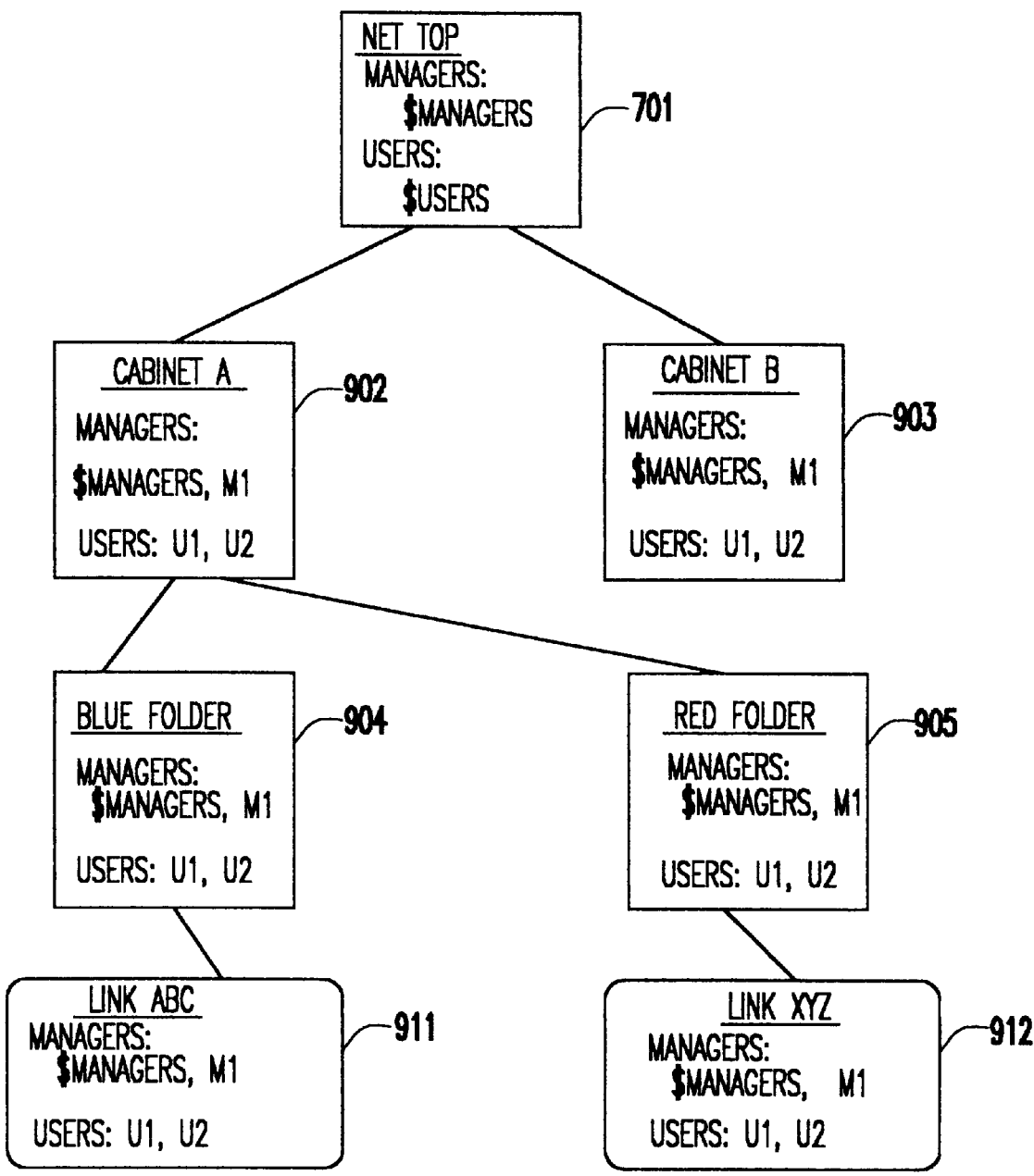
Figure 10:
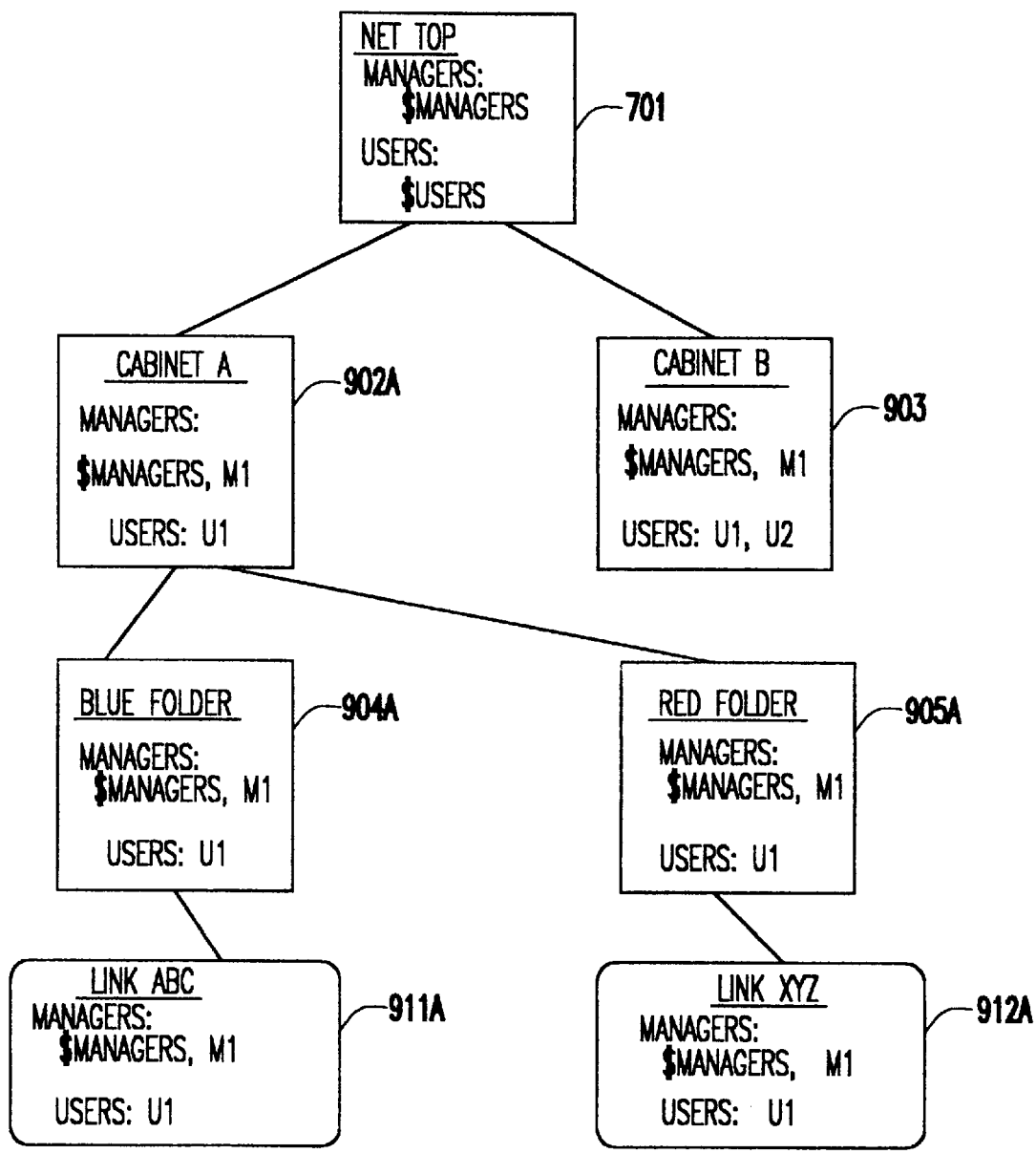

An example of granting user accesses is illustrated in FIGS. 9 and 10. Referring to FIG. 9, another initial configuration of resource links and containers is shown within the NetTop hierarchy 701. For instance, all of the containers 902, 903, 904, and 905 and resource links 911 and 912 were created by Resource Manager, M1. Users U1 and U2 have been previously granted access to all containers and resources within the NetTop hierarchy 701. User U2's access to container Cabinet A 902 is removed and the resulting accesses are shown in FIG. 10.

Referring now to FIG. 10, all containers and resource links beneath Cabinet A 902a in the hierarchy now illustrate that since user U2 no longer has access to Cabinet A 902a, it no longer has access to Blue Folder 904a, Red Folder 905a, Link ABC 911a or Link XYZ 912a. User U2 does still have access to Cabinet B 903 because this container does not fall beneath the Cabinet A 902a hierarchy. The Bull's Eye model dictates that if a user is to have access to any container or resource link, the user must have access to every parent container, thus generating the resulting accesses.

Figure 11:
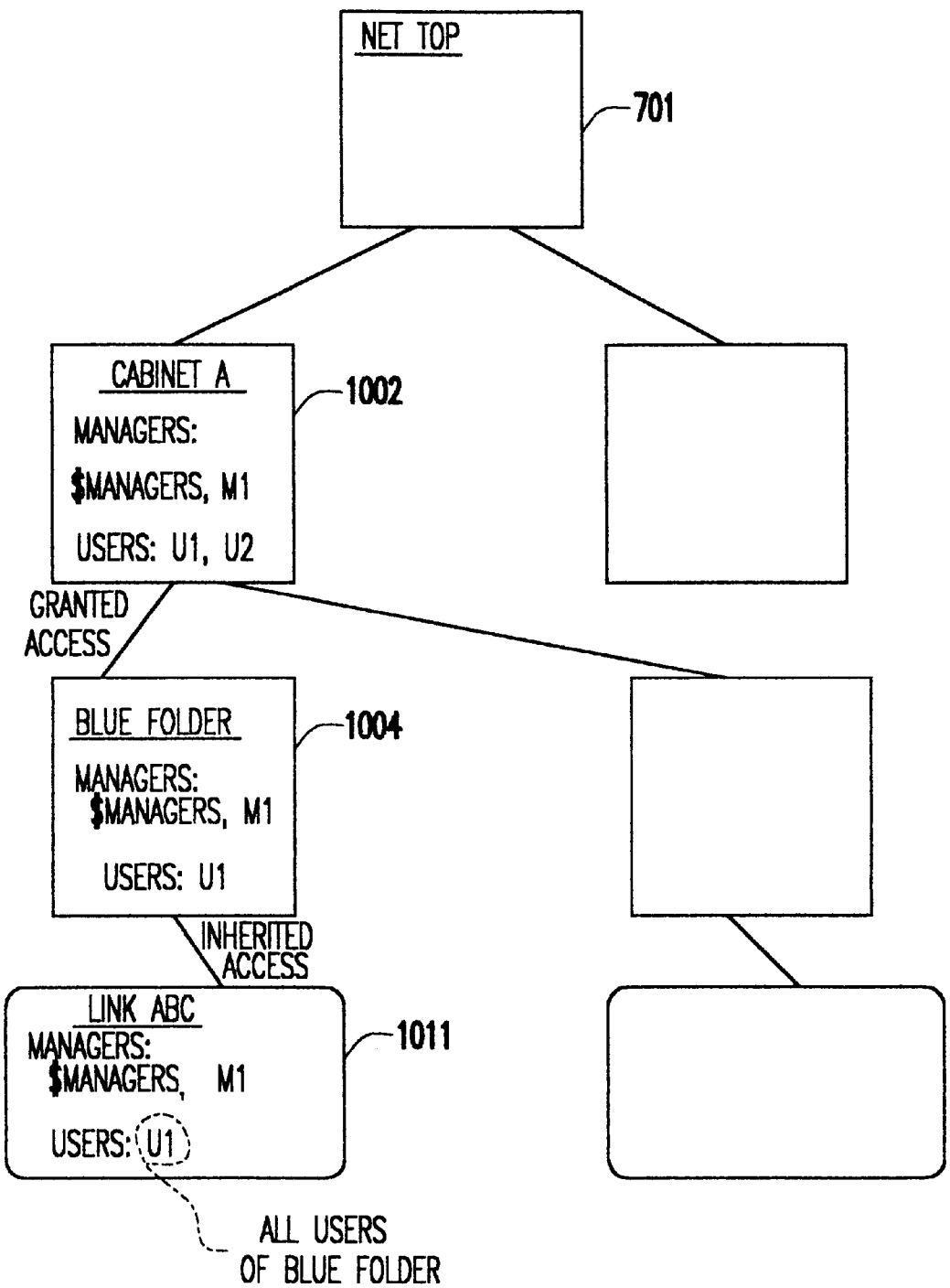
Figure 12:
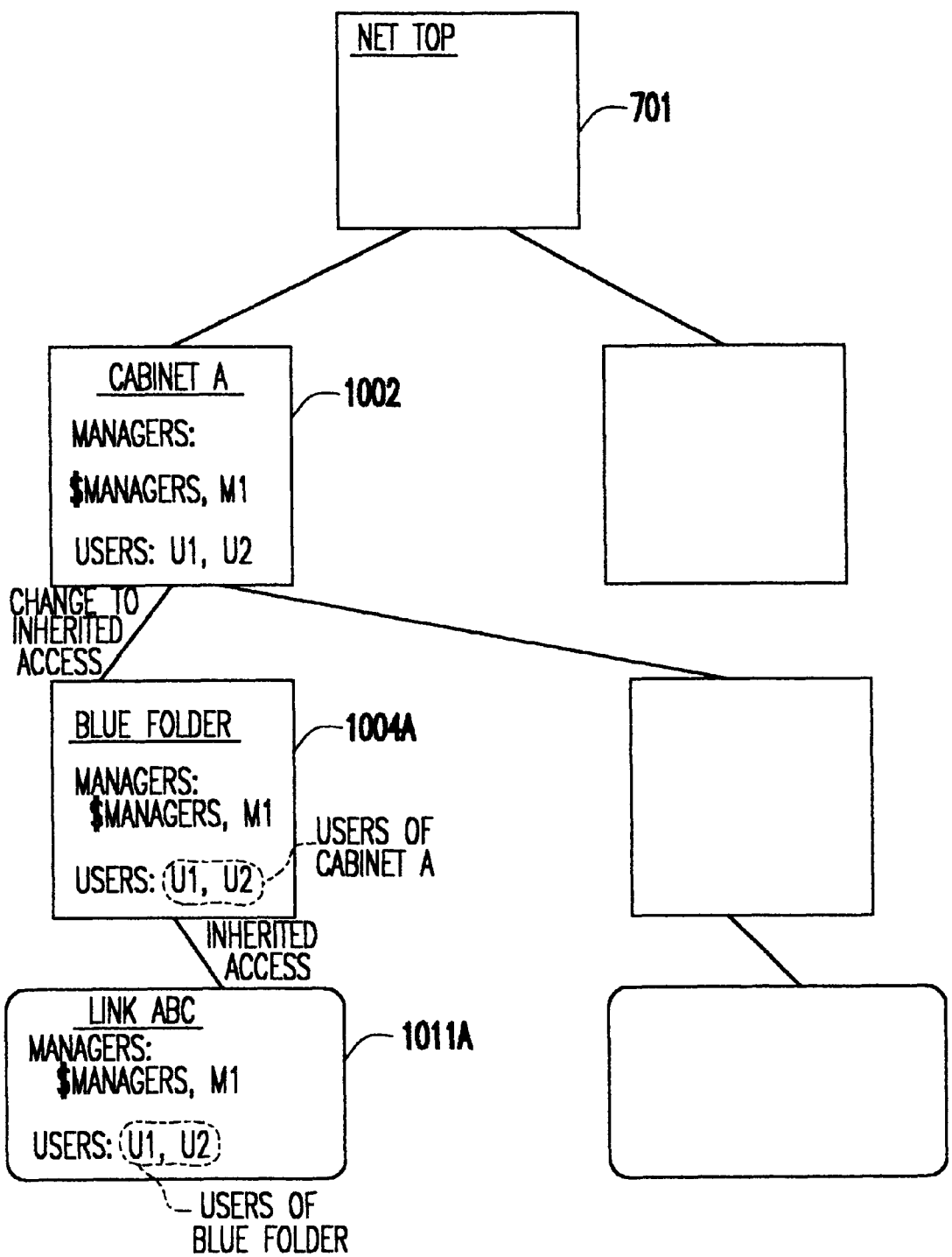

Finally, an example is shown to illustrate what happens when user access is changed for a container using inherited access in FIGS. 11 and 12. Referring to FIG. 11, another initial configuration of resources and containers is shown within the NetTop hierarchy 701. Inherited access means that any user that can read the parent container will also be able to read the child container or resource link. In this example, Link ABC 1011 uses inherited user access. Thus, Link ABC 1011 is inheriting access from its parent container Blue Folder 1004. Blue Folder 1004 only gives user access to a subset of the users of its parent container Cabinet A 1002. If user access to Blue Folder 1004 is changed to inherited access, as shown in FIG. 12, then user U2 gains access to both the Blue Folder 1004a and Link ABC 1011a.

Management of group access within the system container hierarchy is done using a Lotus Script Library. Routines within the library make the changes needed to group documents in the NAB to implement the desired access structure. To illustrate, below is pseudocode for the routine that traverses the group hierarchy to make a change to manager access as showed in FIGS. 7 and 8 where a new manager was added to a high level container.

```
subroutine AddUserGroup(ParentGroup, UserName)
    get ParentGroup document in NAB
    get list of Group documents matching the containers whose
        parent is ParentGroup
    for all ChildGroups
        if not inherited access then
            add UserName to group
            call AddUserGroup(ChildGroup, UserName)
        endif
    end forall
end subroutine
```

Configurable Resource Containment Hierarchy

Fundamentally, the EnterpriseXspan Environment Server was created to provide secure navigation to resources. To accomplish this, it was necessary to define a flexible scheme for implementing the resource class part of the link-object-class model that was discussed earlier. The resource class part of the model essentially provides reusable templates for creating new resource objects and organizing links to those resources in containers. Important features of this interface is that it is secure, flexible, and dynamic. The EnterpriseXspan Environment Server Plug-in Interface incorporates this design. The Plug-in Interface is the implementation of the following two of the aspects of the invention:
1. Configurable resource containment hierarchy.
2. Plug-in interface for adding new resources to a Web application.

The easiest way to cover the concepts of the Plug-in Interface is to look at examples of how it is implemented in the Lotus Domino application in the 3.5 version of the EnterpriseXspan Environment Server. In this version, a resource class database is used to store resource class documents. A resource class document defines the attributes, usage, and parameterization requirements for a resource object and resource link of the class. Most resource classes have generic names, e.g., "Discussion" or "Folder", that imply how objects of that class may be used.

In the present invention, all resource classes derive from one of three base classes:
1. Container
2. Lotus Notes Template
3. Connector Examples of Resource Classes include:
Cabinet (derived from Container)
Binder (derived from Container)
Folder (derived from Container)
CICS (Customer Information Control System) Access (derived from Connector)
3270 Access (a Connector)
CSPIN (Company Supply Parts Info. Network)(a Connector)
Discussion (a Lotus Domino Template)
Calendar (a Lotus Domino Template)
News (a Lotus Domino Template)
URL (a Connector)

Prior to the implementation of a configurable containment resource hierarchy of the present invention, there was only one type of container defined for the system along with three types of resources. The container was a folder and the resources were News, Discussion, and Link. If a customer wanted a different name for the container or the resource classes, then the system software developers would need to develop custom code for the system to accommodate this request. The present invention implements a flexible containment hierarchy so that customers can define their own resource classes and containers, choose the name, icons and behavior of the class and how the classes interact.

There is a certain set of information that is common across the base classes. The common information includes things like the name of the resource class, the icon used to represent it, and the base resource class. There is also security information associated with the class definition such as the groups of users allowed to create objects based on the class and users who are allowed to use resource links to objects created from the class.

Figure 13:
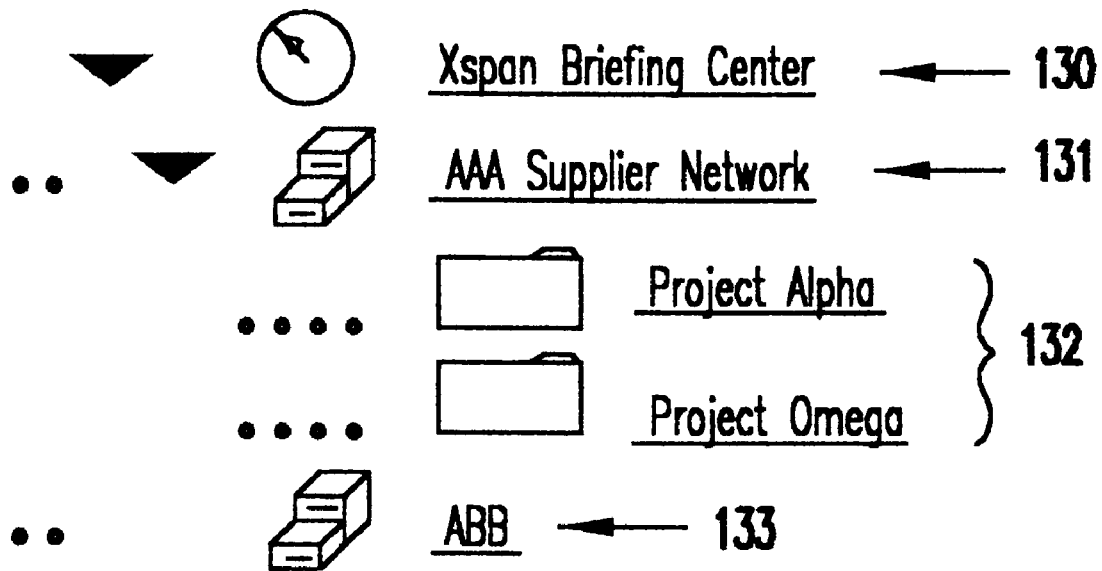
FIG. 13 is a diagram illustrating the concept of cabinets and folders within a cabinet in the EnterpriseXspan Briefing Center Server.

The container base resource class is the implementation of the configurable containment hierarchy. The container base class allows a resource integrator to dynamically reconfigure the containment structure in a hierarchy. By default, two primary containers: cabinets and folders are provided. Cabinets may contain other cabinets, folders, or a variety of predefined resource classes. Folders may only contain other folders and the predefined resource classes. In both cases, everything is rooted off a base NetTop container which is the root container for an entire EnterpriseXspan Server. In the example shown in FIG. 13, the Xspan Briefing Center, or NetTop, hierarchy 130 contains two cabinets 131 and 133. The first cabinet 131 contains two folders 132. Resource integrators are able to change the containment hierarchy or create a whole new one. For example, instead of cabinets and folders, a customer can use bookshelves and binders as their containers, represented by appropriately selected icons. They can also specify what other links to resource object can be placed in those containers.

Figure 14:
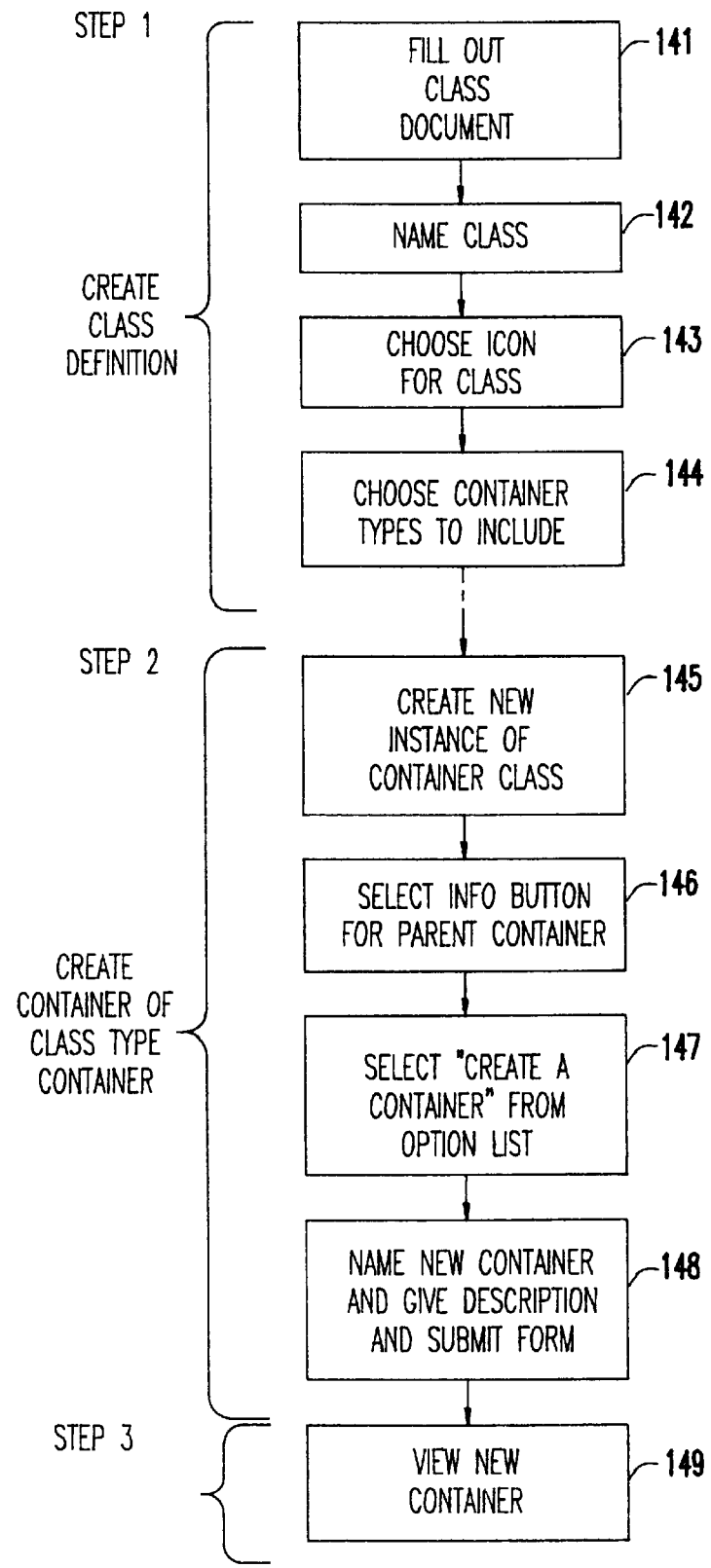
FIG. 14 is a flow diagram of the method to add a new container class according to the present invention.

FIG. 14 shows a sample flow diagram of the steps needed for a resource integrator to add a new container. There are three basic steps:

1) create a class definition for a container;
2) create a container of class type container; and
3) view the results.

Figure 15:
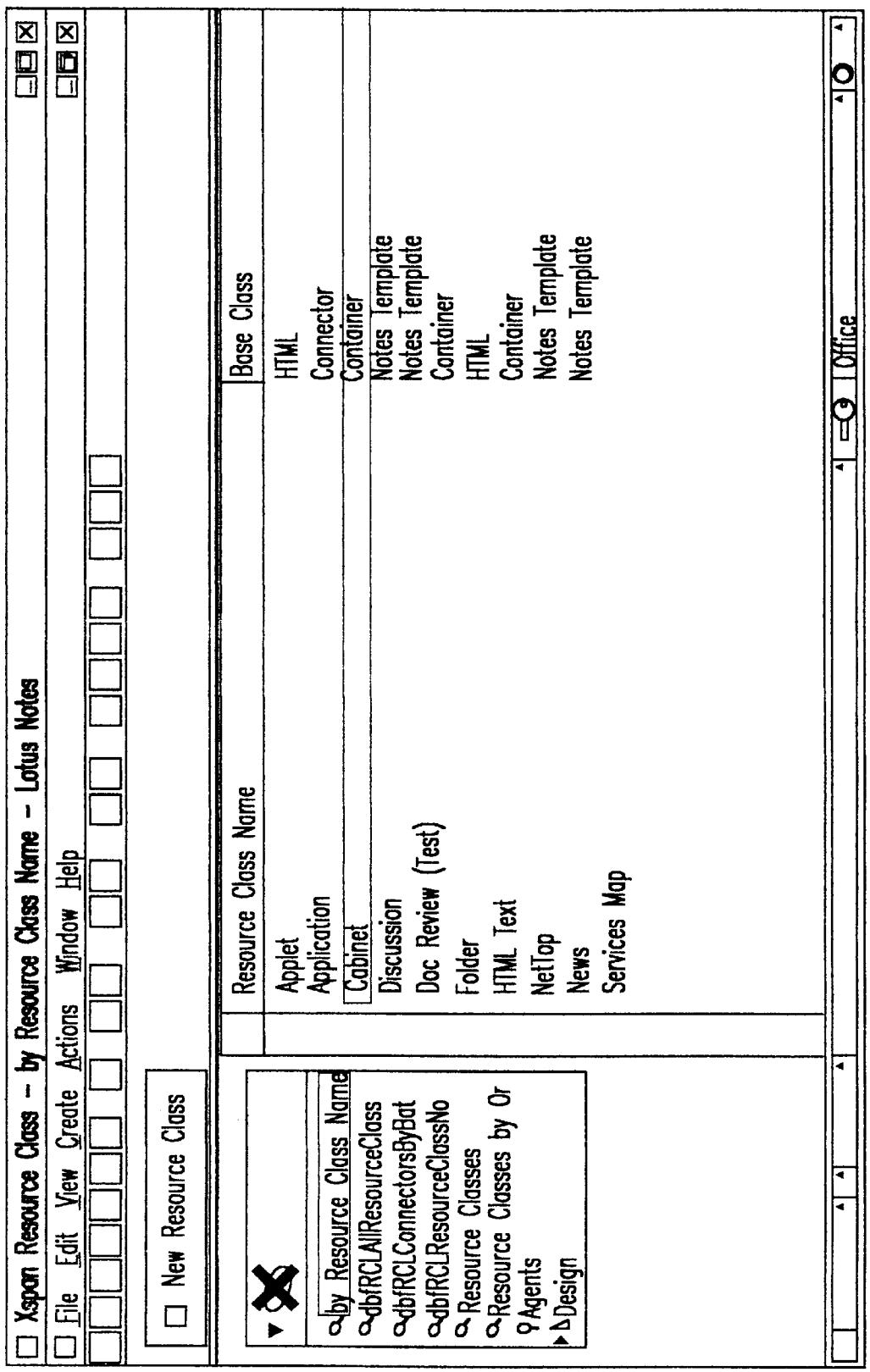

If one desires to create a container of a class that already exists, step 1 above would be skipped. If one desires to modify an existing container class, step 1 would bring up existing parameters for modification. In order to complete step 1, through a Lotus Notes interface, the resource integrator fills out a new class document in function block 141. FIG. 15 illustrates a view that shows the list of resource class documents that a resource integrator might see before creating a resource class, as in the flow diagram of FIG. 14. FIG. 16 shows the form used to create a new class of any type. In this case, a new type of container called "Red Cabinet" 161 is being defined. Referring again to FIG. 14, the Class is given a name as in FIG. 16, entry 161 and the type is chosen to be a container in entry 162, in function block 142. The default icon is chosen in function block 143 as shown in FIG. 16, entry 163. A description of is entered as shown in entry 164.

The parameters displayed on the resource class document during resource class creation change depending on the type of resource being created. What is shown and hidden is controlled by "hide when" formulas based on the base class of the class being defined. In FIG. 16, a container class is being defined so the user is prompted for container name, icon and valid content types. If this had been a class based on a Lotus Notes template database, the resource integrator would have been prompted for the name pf the template and the subdirectory in which to store databases of that class.

Existing containers can be modified by editing the documents for an existing class. If a new container class needs to be added to the potential contents of an existing container class, the existing class is edited and the new class is chosen through a checkbox interface.

Figure 17:
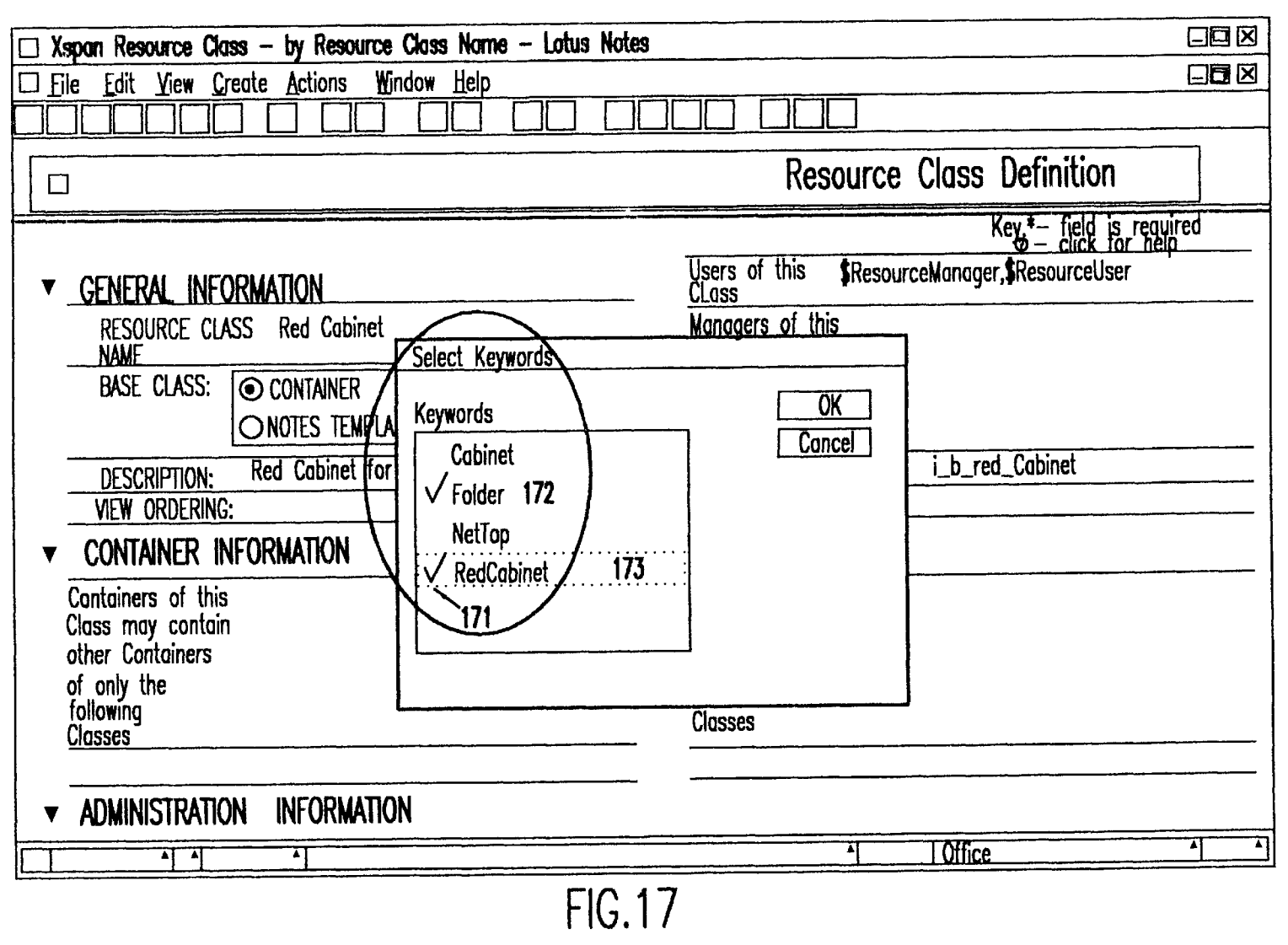
Figure 18:
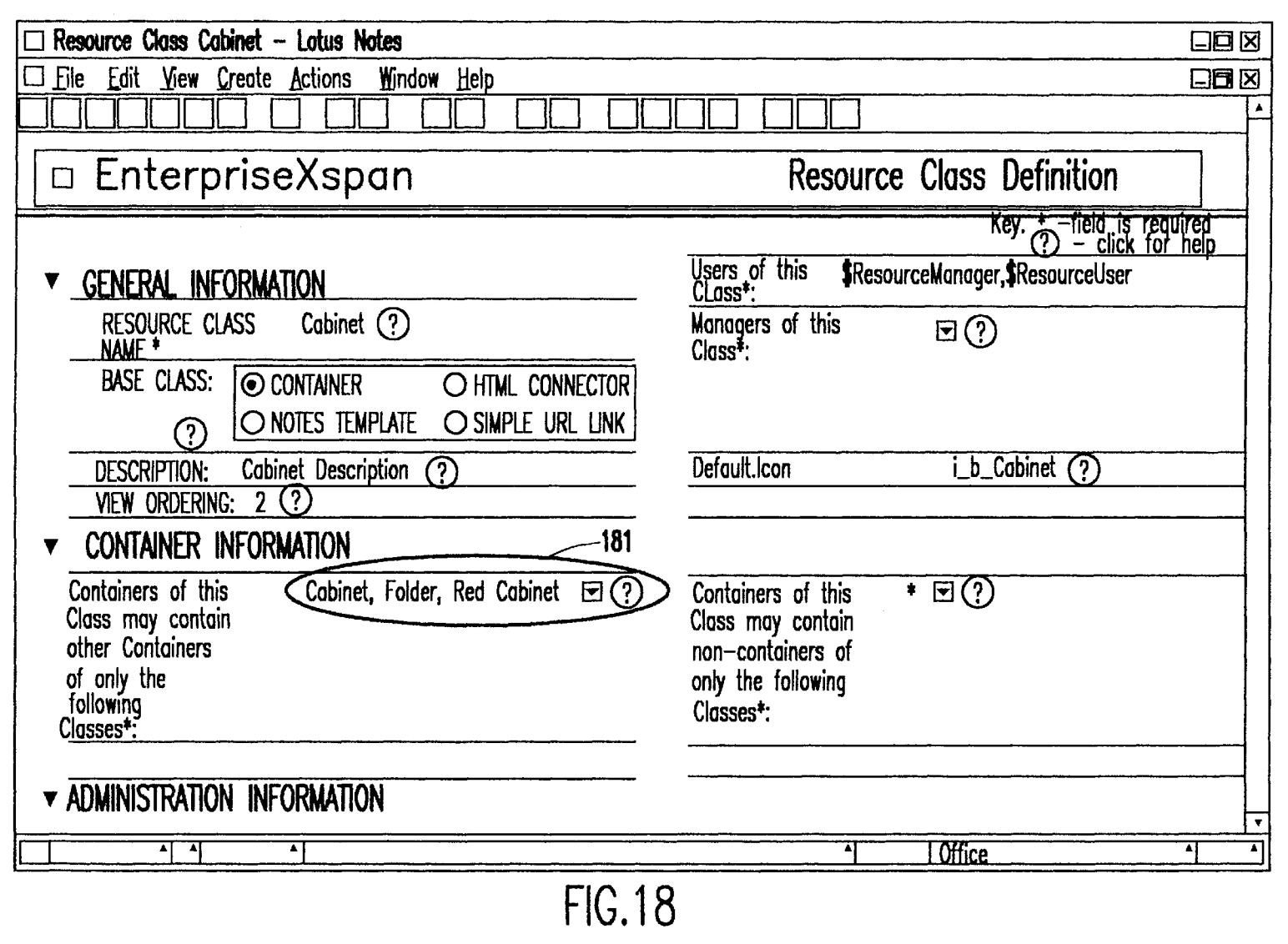

During creation of the new container class, it is necessary to select which other classes of containers can be added to this container. This allows the resource integrator to dynamically define a container hierarchy within the local installation of the EnterpriseXspan Environment Server. This is done in function block 144, and an example is shown in FIG. 17. Referring now to FIG. 17, the check marks beside the container types 171 indicate that the system administrator has chosen only Folders 172 and other Red Cabinets 173 as the potential contents of Red Cabinets. In order to allow the new container class, or cabinet, "Red Cabinet" to be able to contain any other containers, the class documents of those classes must be altered as shown in FIG. 18. In this case, the Cabinet Class is changed to allow Red Cabinets 181.

Figure 19:
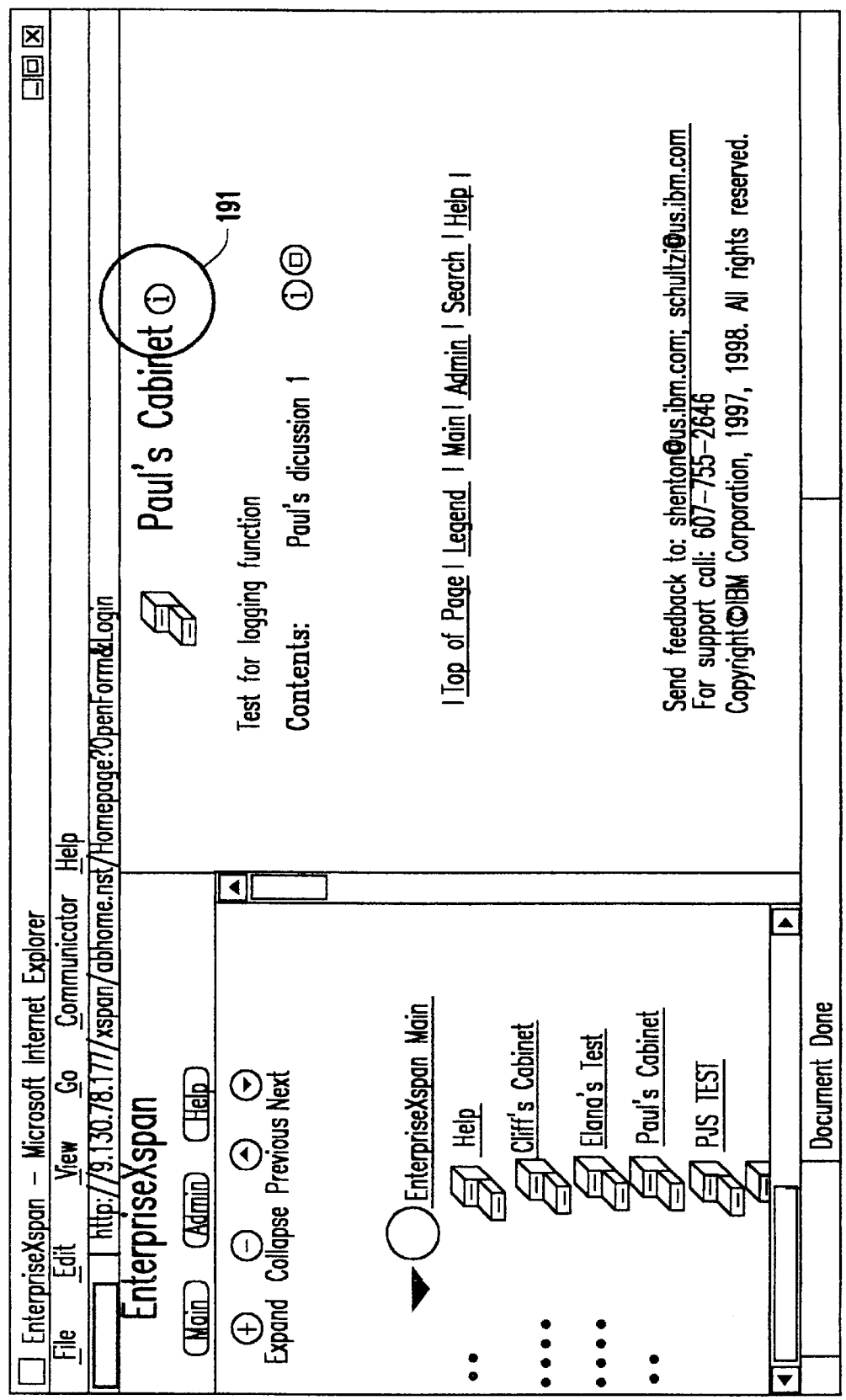
Figure 21:
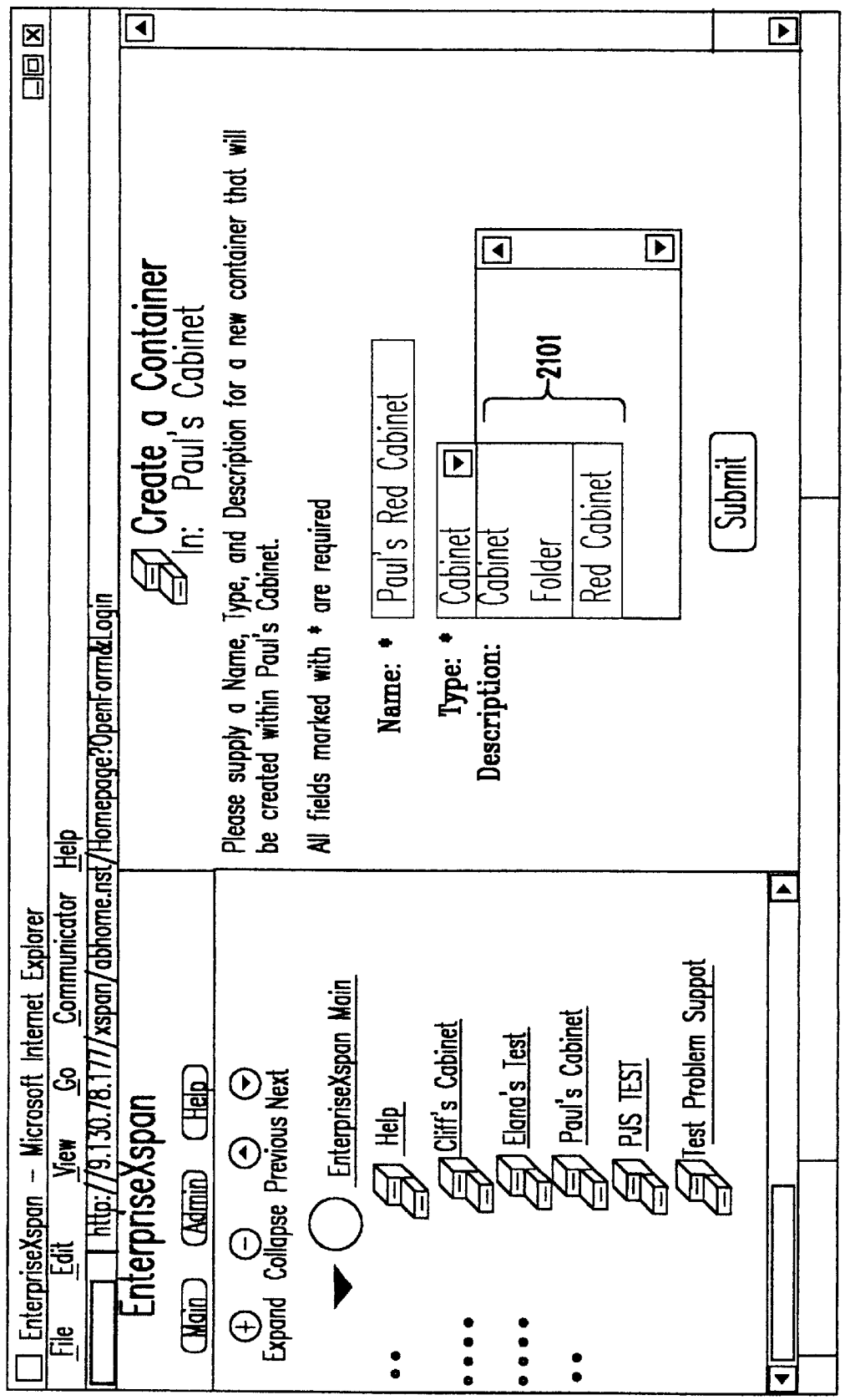

Referring again to FIG. 14, step 1 is now complete. Step 2 commences in function block 145 where a new instance of the Container Class is created using a Web browser interface. The information button for the parent container is selected in function block 146 as shown in FIG. 19 at 191 to bring up the Properties window. In other words, to add a container to an existing container, a resource manager chooses the information button 191 from the parent container. Again referring to FIG. 14, the resource manager in creating a new container of class "Red Cabinet", selects "Create a Container" from the list of options list of a parent container in function block 147. This is shown in FIG. 20 at 2001. In this case, the parent container is "Paul's Cabinet." The screen as shown in FIG. 21 is then displayed. The resource manager then gives the new container a name and description and submits the form in function block 148, as shown in FIG. 21.

When the resource manager picks a class (type) for the container to be created from the pull down list 2101, a container of type "Red Cabinet" can be chosen, as well as Folders and Cabinets, in general. This is because of the changes to the Cabinet container class, previously made, and described above as shown in FIG. 16.

Now that the resource manager has added a new container class to the EnterpriseXspan Environment Server, as described above, any instance of the class will be displayed in their parent containers with their names and icon that was chosen in function block 143 of FIG. 14 above. Also, once the container has been created, step 2 is complete. Step 3 commences in function block 149, and the new container is displayed, as shown in FIG. 22.

Figure 22:
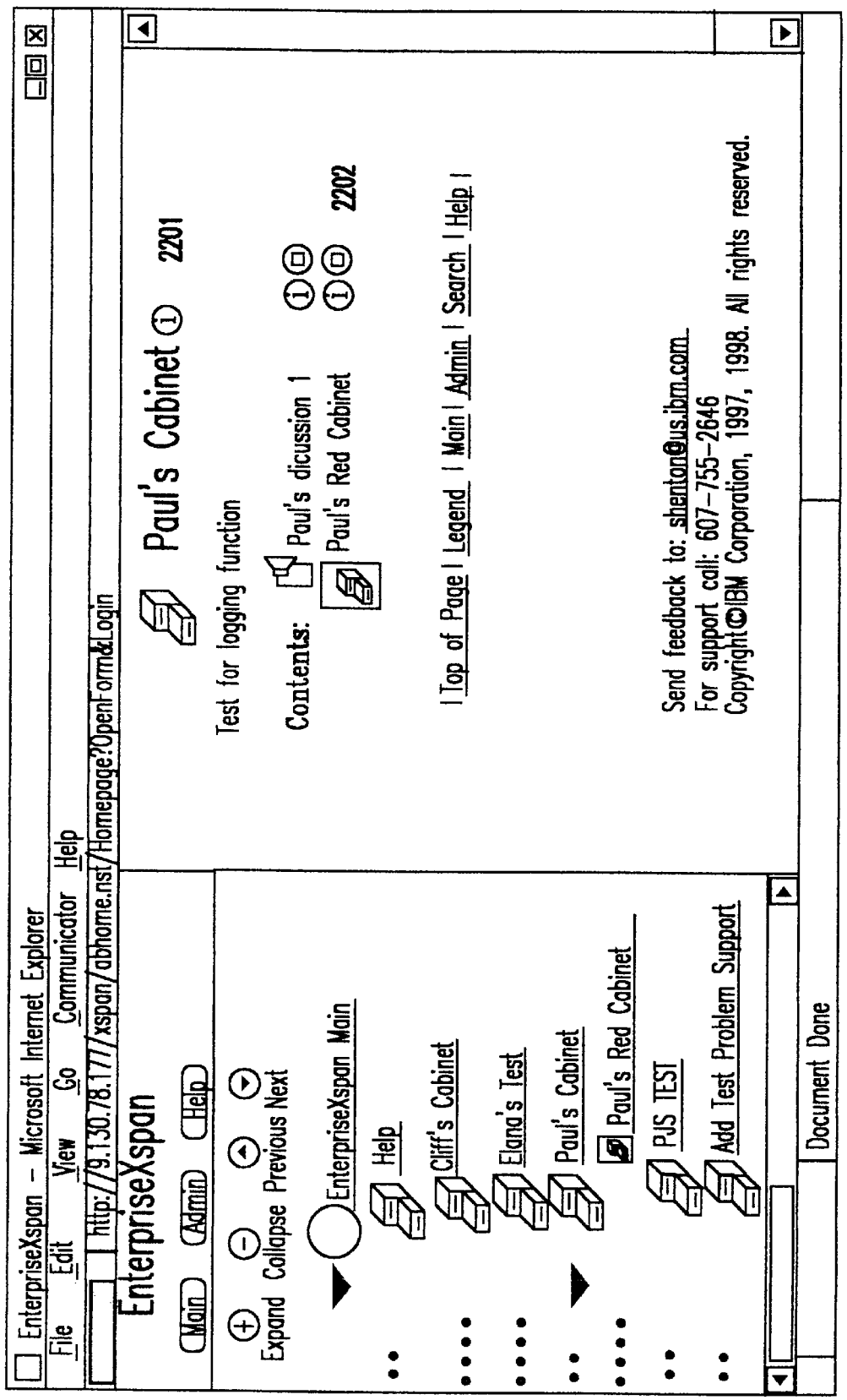
Figure 23:
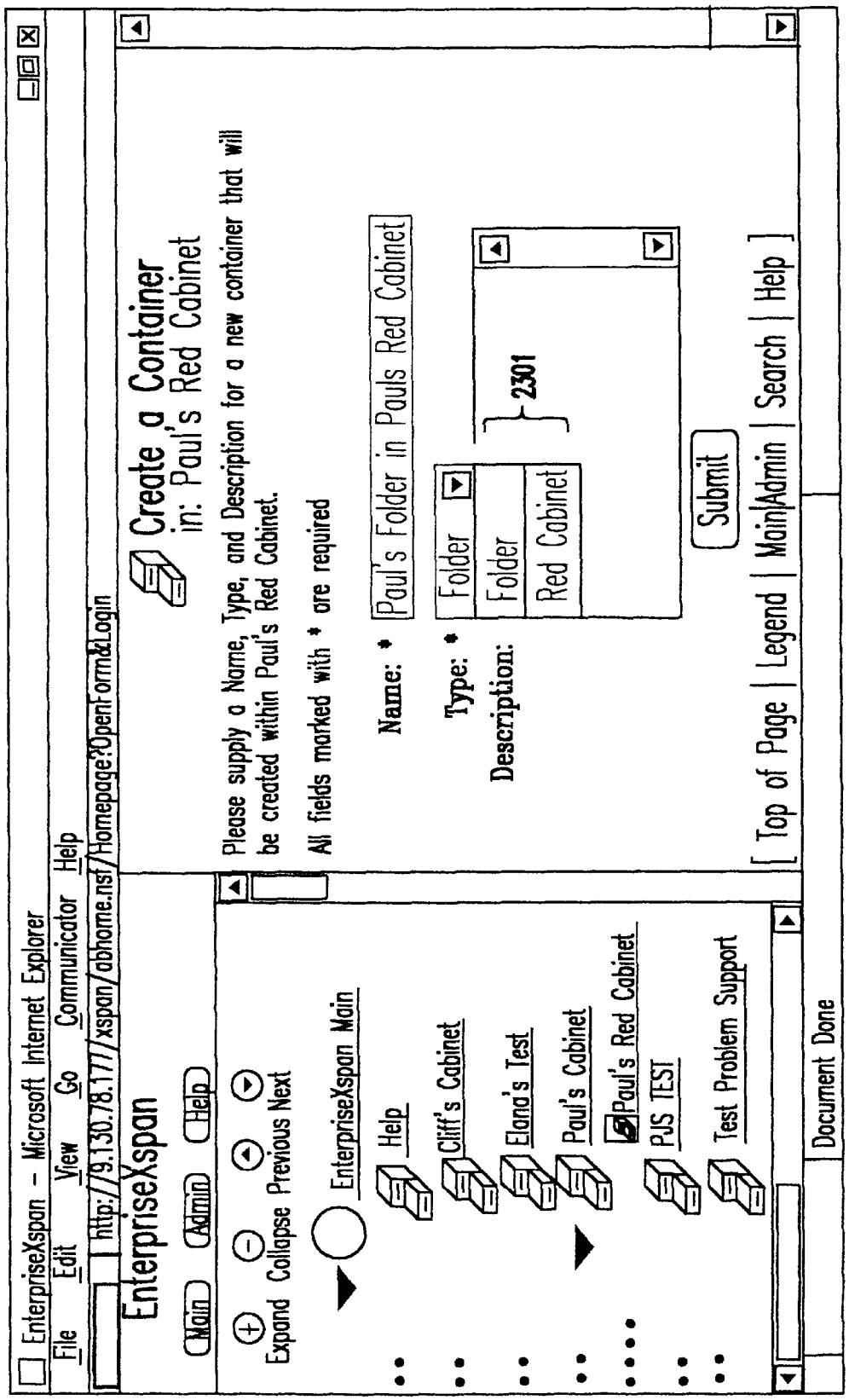

FIG. 22 illustrates that "Paul's Cabinet" 2201 now contains the new container "Paul's Red Cabinet" 2202 as shown in the user interface with the icon selected in the class definition. If the resource manager tries to create a new container within "Paul's Red Cabinet", the only options available for class type of the new container are "Folder" and "Red Cabinet." This is shown in FIG. 23 at 2301.

While the Container Base Resource Class is the implementation of the configurable containment hierarchy, the other two base resource classes, connectors and Lotus Domino templates, are the implementation of the plug-in interface for adding new resource objects to a Web application. These base classes allow resource integrators to quickly define new resource links.

Connector—This allows users to attach HTML and Java applets to connect users to a selected resource.

Notes Templates—These are actually templates of applications that can be used to create new resource objects which are specific to the needs of a given group.

The 3.5 version of the EnterpriseXspan Environment Server shipped with several examples of resource classes defined in each base class.

This allows new applications to easily be integrated with the EnterpriseXspan product. This integration may be as simple as providing a URL for a web based application and yet provides the flexibility for adding Java based connectors to main frame systems. The attributes gathered for these classes depend on the base class specified in the class document in the class database. The Lotus Notes Template base class provides the most powerful interface as it allows application templates to be created. These templates are used to create separate applications for groups of users. Each application is customized to the specific needs of the group, and the EnterpriseXspan product automatically manages the security by placing the groups used to manage the access to the resource links directly in the access control lists of the application.

Dynamic Web User Interface Using Resource Profiles

The final aspect of the invention is Dynamic Web User Interface Using Resource Profiles. This innovation allows administrators to dynamically alter the user interface to the system through a Web management application. Changes to the interface include such things as what is displayed in each pane (or frame), images and error message content, background colors and logging levels. This concept is implemented in the present invention using Lotus Domino. The EnterpriseXspan Environment Server is comprised of several Domino databases. User interface changes such as background color and error message content must be distributed to all databases to "take hold" across the system. The present invention gives users the ability to make these changes using a Web browser from anywhere on the Internet.

Prior art required a static user interface stored on Lotus Notes forms. When users navigated through the system, they had no ability to change the system characteristics. To make a change would require an experienced Lotus Notes developer to alter the forms that make up the system so that the new interface was presented.

The dynamic Web interface of the present invention is implemented in the system with Lotus Domino profile documents. Profile documents in Lotus Notes are documents that contain a set of system or database values that need to be available to all code in the database. Obtaining values from these documents is much quicker than reading a value from conventional documents in Lotus Notes. The speed of access to these parameters makes profile documents more practical for parameters that are repeatedly accessed such as those used to produce the Web user interface. The present invention takes advantage of this speed of access, by moving these parameters such as background colors, font colors, HTML for graphics and error message content to these profile documents.

Because the EnterpriseXspan Environment Server release 3.5 is implemented as a set of many Lotus Notes databases, when a change is made, it needs to be distributed to each of the databases used in the user interface. These databases include:

Administration DB—manages links to other things and navigates through system
Help DB
System Event Log
System Images
System Messages
Group DB (user groups)
User registration DB
Home DB (generating the first page when going to a Web site)

In addition to the databases that make up the system, other Lotus Domino databases can be created that correspond to resource objects that have been created by the resource integrators and managers. The system keeps the user interface for these managed databases in synch with the system databases. For instance, if there are 100 users and each creates a Lotus Notes Discussion database, by default, each of the Discussion databases will use centralized system messages. Therefore the changed profile parameters must propagate to each of those 100 databases. This is done using a Lotus Domino agent to rewrite the profile document to each of these databases.

When a Web page is presented to an end user, user interface parameters such as background color and the message content are looked up in the profile document and reflect the current values. As new resources are created, a document is written indicating that the new databases need to be updated with any changes to the profile document, giving the new resource the same "look and feel" as the rest of the system. In this way, the entire system can maintain a consistent user interface even as elements of the user interface are altered by managers.

Figure 24:
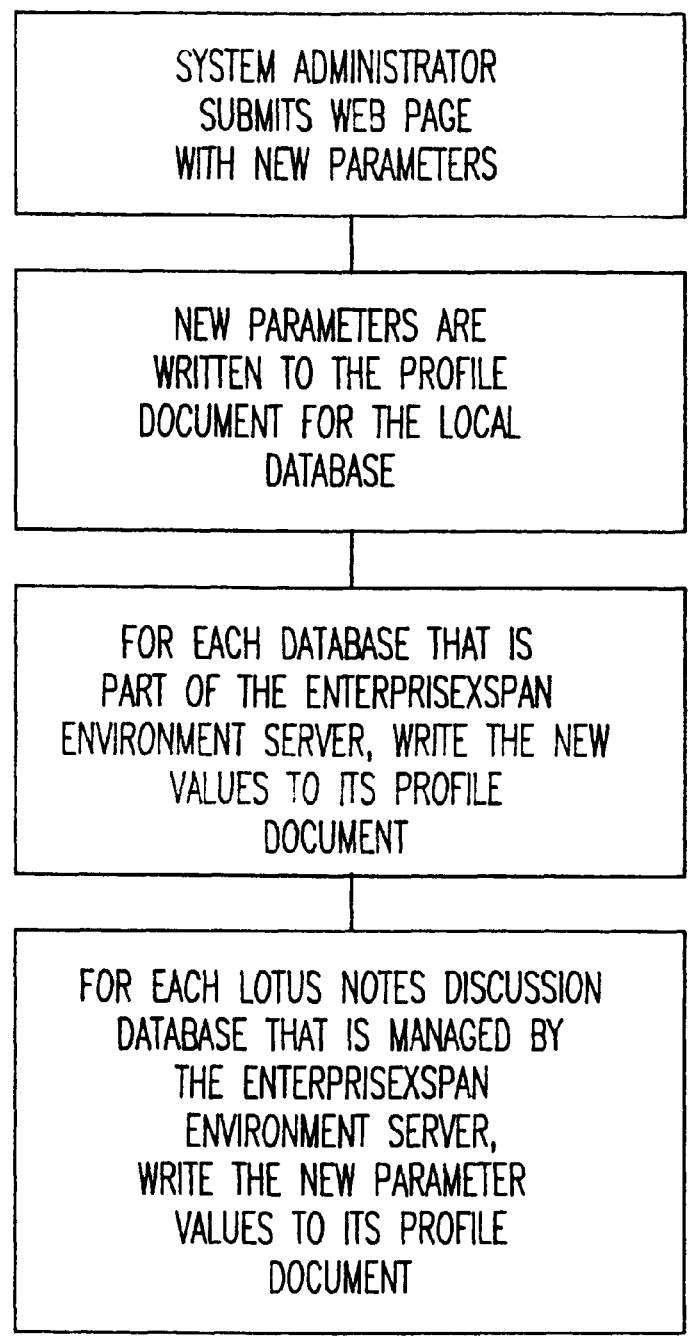
FIG. 24 shows a flow diagram of the method used by a system administrator to change a parameter on one of the system documents.

FIG. 24 shows a flow diagram of the method used by a system administrator to change a parameter on one of the system documents. First the system administrator submits a Web page with the new desired parameters in EnterpriseXspan Environment Server in function block 241. The system writes the new parameters to the profile documents for the local database in function block 242. A loop is performed for each database that makes up the EnterpriseXspan Environment Server in function block 243, where the new values are written to the profile documents for each server database.

Finally, in function block 244 another loop is performed for each Lotus Notes database managed by the EnterpriseXspan Environment Server, where the new parameter values are written to the profile documents for each Lotus Notes database in the hierarchy.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An electronic-business-to-electronic business portal that organizes access to extended business applications wherein enhanced security and administrative tools allow said portal to be shared throughout enterprises and across supply chains, providing secure access to collaborative applications by business partners and suppliers, comprising:

means for implementing a plurality of dynamic containers wherein said dynamic containers are configurable and are represented in a desired hierarchy, said hierarchy including at least one resource link;

means for adding and deleting resource links to a list of available resource objects in said hierarchy, said resource links allowing user access to an application represented by a resource object, wherein said resource objects are chosen from a set of resource classes defining general categories of application types and the parameters needed to access said applications;

means for managing sets of resource users and resource managers in said hierarchy allowing said resource managers to see all resource links to which they have authority to manage, and allowing said resource users to see only links to a list of available resource objects in said hierarchy which said resource users have been allowed access, said access granted by said resource managers; and means for dynamically altering a user interface to said hierarchy or said dynamic containers and said resource objects through a Web management application.

2. An electronic-business-to-electronic-business portal as recited in claim 1, wherein a plurality of said dynamic containers are nested within said hierarchy.

3. An electronic-business-to-electronic-business portal as recited in claim 1, wherein said resource manager provides a first link to said resource object from a first dynamic container and a second link to said resource object from a second dynamic container thereby enabling a resource object to be provided in multiple ones of said dynamic containers.

4. An electronic-business-to-electronic-business portal as recited in claim 1 wherein said means for implementing said dynamic containers manages a one-to-many relationship between a resource object and at least one resource link.

5. An electronic-business-to-electronic-business portal as recited in claim 1 wherein said means for implementing said plurality of dynamic containers uses a three-tiered structure for defining Web resource links, said three-tiered structure comprising a top level having a plurality of resource classes, an intermediate level having a plurality of resource instances, also known as resource objects, of said resource classes, each said resource object having a link to a resource class, and a low level having a plurality of resource links wherein each resource link at said low level points to a resource object at said intermediate level which is an instance of a resource class at said top level.

6. An electronic business-to-electronic business portal as recited in claim 1, wherein said means for dynamically altering the user interface submits a Web page with new parameter values for said user interface and then writes said new parameters values to the profile document for a local database and then, for each database whose user interface is controlled by said portal, writes said new parameter values to an associated profile document.

7. An electronic-business-to-electronic-business portal as recited in claim 2, wherein said means for implementing a plurality of nested dynamic containers uses a security access model wherein each entity in said hierarchy of said dynamic containers and said resource links has both a group of users having read access to said entity and a group of managers, having read and write authority to said entity.

8. An electronic-business-to-electronic-business portal as recited in claim 2, wherein said means for managing sets of resource users and resource managers in said hierarchy of nested said dynamic containers comprises:

a plurality of uniquely identified container documents and a plurality of uniquely identified resource link documents, wherein a resource link document comprises the contents of a dynamic container using a plurality of databases containing a plurality of resource link documents, a plurality of resource object documents, and a plurality of resource class documents, said dynamic container being a member of a specialized class of resource objects;

said hierarchy comprising a plurality of said dynamic containers and a plurality of said resource link documents, each having both a group of users and a group of managers, wherein said group of managers is a subset of said group of users, said group of users having at least read access to said dynamic containers and said resource links, and said managers having read/write access to said dynamic containers and said resources links;

a plurality of documents stored in a database, each said document associated with at least one user having at least one first field controlling read access and at least one second field controlling read/write access whereby said first fields and said second fields are used to authenticate user access to a document; and an access scheme whereby nested groups of users are implemented wherein each dynamic container has associated with it and controlling access to it, a group of users, contents of said group of users being dynamically managed through a Web interface in such a way as to guarantee that after each modification to user of management access, user and manager groups of each of the dynamic containers reflect a hierarchy where:

1) each manager of a dynamic container has manager access to the entire set of child containers and resource links to said container, and 2) each user of a dynamic container or resource link has access to the entire set of parent containers to said container or said resource link, up to and including the top of the hierarchy of containers.

9. An electronic-business-to-electronic-business portal as recited in claim 5 wherein each said resource link contains an HyperText Markup Language (HTML) link to an application represented by a resource object, said application residing on an intranet or on the Internet and accessible using a standard Web browser.

10. A method for creating a resource object by a resource manager which allows said resource manager to provide access to said resource object in multiple dynamic containers in an electronic-business-to-electronic-business portal, said method comprising the steps:

(a) creating a resource object of a desired class of resources accessible through a dynamic container containing a link to said resource object by creating a new resource object document in a resource object database with parameters selected by a resource manager, wherein a set of available parameters are defined in a resource class document in a resource class database of said desired class and a set of available resource classes is defined by a resource integrator;

(b) entering a name of said desired resource class in said resource object document, wherein said resource class name acts as a link between said resource object and its parent class document;

(c) creating a plurality of group documents in a system directory wherein said group documents control user and manager access to said resource object; and (d) constructing said resource object, comprising the steps:

(1) creating a resource link document to said resource object, said resource link document residing in a resource link database, containing a system unique ID of a dynamic container document in which a resource link was created and also containing a system unique ID of said resource object to which said resource link is associated;

(2) creating a plurality of group documents in a system directory wherein said group documents control user and manager access to said resource link;

(3) adding said group names to a first field controlling read access and to a second field controlling read/write access of said resource link document allowing dynamic addition and deletion of new resource links; and (4) adding said group names to group documents that control access to resource object documents.

11. A method as recited in claim 10, wherein each said resource class is defined by said resource integrator using a distributed client/server database application coupled with a product that delivers Internet and Web browsing functionality to a user interface.

12. A method as recited in claim 10, further comprising a second dynamic container wherein steps d(1) through d(4) are performed using said second dynamic container such that references to which said resource class, said resource object and said resource link refer are the same for both said first and second dynamic containers.

13. A method allowing end users to access resources via a portal using standard Web browsers to view and execute their own customized menu of applications, said method comprising the steps of:

(a) creating a set of available resource classes;

(b) creating enterprise resources, including containers, resource objects, and resource links;

(c) granting and deleting access and control to resource managers and resource users;

(d) Repeating steps (a) through (c), as necessary, to accommodate changes in an enterprise hierarchy of resources and containers, and changes in resource user and resource manager access; and (e) displaying said customized menu in a standard Web browser.

14. A method allowing end users to access resources via a portal using standard Web browsers to view and execute their own customized menu of applications as recited in claim 13 wherein step (a) further comprises the step of defining a plurality of resource classes, modifying an existing resource class, if necessary, said resource classes defined and modified by a resource integrator using distributed client/server database application coupled with a product that delivers Internet and Web browsing functionality to a user interface.

15. A method allowing end users to access resources via a portal using standard Web browsers to view and execute their own customized menu of applications as recited in claim 13 wherein step (b) further comprises the step of creating a custom enterprise hierarchy, or modifying an existing hierarchy, said hierarchy comprising containers, and resource links, by an authorized resource manager using a standard Web interface, said resource links providing access to resource objects.

16. A method allowing end users to access resources via a portal using standard Web browsers to view and execute their own customized menu of applications as recited in claim 13 wherein step (c) comprises the steps of:

(1) creating a set of resource managers and a set of resource users;

(2) modifying at least one first field controlling read access and at least one second field controlling read/write access associated with said resource objects and resource links, by a resource manager enabling each authorized resource user to access a custom hierarchy using a standard Web interface; and (3) authenticating said resource managers, and said resource users via a userid and password protocol built in to a Web interface, wherein said userid is matched with names in a system database comprising the name of every user, user group, and server in a domain, as well as access levels of each said user, to determine which said customized menu is to be accessed.

17. A method allowing end users to access resources via a portal using standard Web browsers to view and execute their own customized menu of applications as recited in claim 14, wherein the step of defining a plurality of resource classes further comprising the steps:

A. creating a class definition for a container comprising the steps:

(1) filling out a new class document by a resource integrator;

(2) naming the resource class by a resource integrator;

(3) choosing an icon of the class by a resource integrator; and (4) choosing container types to include by a resource integrator; and B. creating a container of a class type of container comprising the steps:

(1) creating a new instance of said container class by a resource integrator;

(2) naming said new instance of said container by a resource integrator;

(3) describing said new instance of said container by a resource integrator; and (4) submitting information to the system for processing, wherein step (A) is repeated to add a new class definition for a container or modify an existing class definition for a container, and is skipped if said new instance of said container class is for an existing container class.

18. A method allowing end users to access resources via a portal using standard Web browsers to view and execute their own customized menu of applications as recited in claim 15 wherein said containers may be nested.

19. A machine readable medium containing code implementing an electronic-business-to-electronic business portal that organizes access to extended business applications wherein enhanced security and administrative tools allow said portal to be shared throughout enterprises and across supply chains, providing secure access to collaborative applications by business partners and suppliers, comprising:

- a first code section for implementing a plurality of dynamic containers wherein said dynamic containers are configurable and are represented in a desired hierarchy, said hierarchy including at least one resource link;
- a second code section implementing a means for adding and deleting resource links to a list of available resource objects in said hierarchy, said resource links allowing user access to an application represented by a resource object, wherein said resource objects are chosen from a set of resource classes defining general categories of application types and the parameters needed to access said applications;
- a third code section for implementing a means for managing sets of resource users and resource managers in said hierarchy allowing said resource managers to see all resource links to which they have authority to manage, and allowing said resource users to see only links to a list of available resource objects in said hierarchy which said resource users have been allowed access, said access granted by said resource managers; and
- a fourth code section for implementing a means for dynamically altering the user interface to said hierarchy or said dynamic containers and said resource objects through a Web management application.

20. A machine readable medium containing code implementing a method for creating a resource object by a resource manager which allows said resource manager to provide access to said resource object in multiple dynamic containers in an electronic-business-to-electronic-business portal, said code implementing the steps of:

(a) creating a resource object of a desired class of resources accessible through a dynamic container containing a link to said resource object by creating a new resource object document in a resource object database with parameters selected by a resource manager, wherein a set of available parameters are defined in a resource class document in a resource class database of said desired class and a set of available resource classes is defined by a resource integrator;

(b) entering a name of said desired resource class in said resource object document, wherein said resource class name acts as a link between said resource object and its parent class document;

(c) creating a plurality of group documents in a system directory wherein said group documents control user and manager access to said resource object; and (d) constructing said resource object, comprising the steps:
  (1) creating a resource link document to said resource object, said resource link document residing in a resource link database, containing a system unique ID of a dynamic container document in which a resource link was created and also containing a system unique ID of said resource object to which said resource link is associated;
  (2) creating a plurality of group documents in a system directory wherein said group documents control user and manager access to said resource link;
  (3) adding said group names to a first field controlling read access and to a second field controlling read/write access of said resource link document allowing dynamic addition and deletion of new resource links; and
  (4) adding said group names to group documents that control access to resource object documents.

* * * * *